United States Patent
Nakahara et al.

(10) Patent No.: US 12,517,333 B2
(45) Date of Patent: Jan. 6, 2026

(54) ZOOM LENS AND IMAGE PICKUP APPARATUS HAVING THE SAME

(71) Applicant: CANON KABUSHIKI KAISHA, Tokyo (JP)

(72) Inventors: Makoto Nakahara, Tochigi (JP); Shinya Okuoka, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 404 days.

(21) Appl. No.: 18/063,120

(22) Filed: Dec. 8, 2022

(65) Prior Publication Data

US 2023/0213739 A1  Jul. 6, 2023

(30) Foreign Application Priority Data

Jan. 1, 2022  (JP) ................................ 2022-000021

(51) Int. Cl.
  *G02B 15/14* (2006.01)
  *G02B 13/00* (2006.01)
  (Continued)

(52) U.S. Cl.
  CPC ....... *G02B 13/009* (2013.01); *G02B 13/0045* (2013.01); *G02B 13/02* (2013.01);
  (Continued)

(58) Field of Classification Search
  None
  See application file for complete search history.

(56) References Cited

U.S. PATENT DOCUMENTS

| 5,184,251 A | 2/1993 | Tsuchida |
| 8,531,768 B2 | 9/2013 | Abe |

(Continued)

FOREIGN PATENT DOCUMENTS

| JP | H07-72391 A | 3/1995 |
| JP | H07-287168 A | 10/1995 |

(Continued)

OTHER PUBLICATIONS

Great Britain Combined Search and Examination Report dated Jun. 15, 2023 issued in GB Patent Application No. 2218805.6.
(Continued)

*Primary Examiner* — Darryl J Collins
(74) *Attorney, Agent, or Firm* — Carter, DeLuca & Farrell LLP

(57) ABSTRACT

A zoom lens consists of, in order from an object side to an image side, a first lens unit having a negative refractive power, a second lens unit having a positive refractive power, and a rear group including one or more lens units. Each distance between adjacent lens units changes during zooming. The rear group includes a focus lens unit having a positive refractive power that moves from the image side to the object side during focusing from an infinite distance object to a close distance object. A lens closest to an object in the focus lens unit has a shape with a concave surface on the object side. The following inequalities are satisfied.

$1.20 < fLP/fL2 < 3.20$ $-3.00 < fL1/fL2 < -0.85$ fLP represents a focal length of the focus lens unit, fL1 represents a focal length of the first lens unit, and fL2 represents a focal length of the second lens unit.

25 Claims, 13 Drawing Sheets

(51) Int. Cl.
*G02B 13/02* (2006.01)
*G02B 27/64* (2006.01)

(52) U.S. Cl.
CPC . *G02B 15/1435* (2019.08); *G02B 15/144507* (2019.08); *G02B 15/144515* (2019.08); *G02B 15/145511* (2019.08); *G02B 15/145521* (2019.08); *G02B 15/1461* (2019.08); *G02B 15/1465* (2019.08); *G02B 27/646* (2013.01)

(56) References Cited

U.S. PATENT DOCUMENTS

| | | |
|---|---|---|
| 9,219,864 B2 | 12/2015 | Nakahara |
| 9,377,606 B2 | 6/2016 | Nakahara |
| 9,500,842 B2 | 11/2016 | Nakahara |
| 10,268,104 B2 | 4/2019 | Nakahara |
| 10,585,268 B2 | 3/2020 | Okuoka |
| 10,718,929 B2 | 7/2020 | Saito et al. |
| 10,754,131 B2 | 8/2020 | Nakahara |
| 10,802,246 B2 | 10/2020 | Okuoka |
| 10,935,755 B2 | 3/2021 | Saito et al. |
| 2010/0149406 A1* | 6/2010 | Katakura ....... G02B 15/144515 359/689 |
| 2010/0157106 A1* | 6/2010 | Morooka ....... G02B 15/144507 359/686 |
| 2010/0188553 A1* | 7/2010 | Mihara .......... G02B 15/144507 348/340 |
| 2010/0277810 A1 | 11/2010 | Shyu |
| 2011/0058260 A1 | 3/2011 | Kim |
| 2011/0310286 A1* | 12/2011 | Arakawa ................ H04N 23/74 359/683 |
| 2012/0050602 A1* | 3/2012 | Imaoka ................ G02B 27/644 359/683 |
| 2012/0113312 A1* | 5/2012 | Yanai ............. G02B 15/143507 359/689 |
| 2013/0250436 A1 | 9/2013 | Ori |
| 2018/0307012 A1* | 10/2018 | Machida ................ G02B 15/20 |
| 2019/0302431 A1* | 10/2019 | Kawamura .......... G02B 15/177 |
| 2020/0026049 A1 | 1/2020 | Machida |
| 2021/0033835 A1 | 2/2021 | Nakahara |
| 2021/0356721 A1 | 11/2021 | Komiyama |
| 2022/0214530 A1 | 7/2022 | Nakahara et al. |
| 2022/0334363 A1 | 10/2022 | Okuoka et al. |
| 2023/0213738 A1 | 7/2023 | Okuoka |

FOREIGN PATENT DOCUMENTS

| | | |
|---|---|---|
| JP | 2002-090624 A | 3/2002 |
| JP | 2006-201599 A | 8/2006 |
| JP | 2007-156078 A | 6/2007 |
| JP | 2010-152316 A | 7/2010 |
| JP | 2011-059493 A | 3/2011 |
| JP | 2011-059496 A | 3/2011 |
| JP | 2015-121768 A | 7/2015 |
| JP | 2015-125383 A | 7/2015 |
| JP | 2016-161889 A | 9/2016 |
| JP | 2018-005165 A | 1/2018 |
| JP | 2019-040029 A | 3/2019 |
| JP | 2019-120822 A | 7/2019 |
| KR | 10-2009-0037701 A | 4/2009 |
| WO | 2017/057658 A1 | 4/2017 |

OTHER PUBLICATIONS

Combined Search and Examination Report issued in corresponding GB Patent Application No. GB2503642.7, dated May 2, 2025, pp. 1-5.
Notice of Reasons for Refusal issued by the Japanese Patent Office on Oct. 14, 2025 in corresponding JP Patent Application No. 2022-000021, with English translation.
Examination Report issued in corresponding GB Patent Application No. 2503642.7 dated Oct. 30, 2025, pp. 1-4.

\* cited by examiner

ZOOM LENS AND IMAGE PICKUP APPARATUS HAVING THE SAME

BACKGROUND OF THE INVENTION

Field of the Invention

An aspect of embodiments of the present disclosure relates to a zoom lens suitable for image pickup apparatuses using solid-state image sensors such as digital still cameras, digital video cameras, broadcasting cameras, surveillance cameras, or the like, or image pickup apparatuses such as cameras using silver-halide films.

Description of the Related Art

Zoom lenses used in image pickup apparatuses are demanded to have a wide angle of view, a small size, and good optical characteristics. As a zoom lens having a wide angle of view, a so-called negative lead type zoom lens has been known that includes a lens unit having a negative refractive power disposed at a position closest to an object.

A negative lead type zoom lens including a lens unit having a negative refractive power on a front side has a characteristic that an angle of view can be relatively easily widened and a long back focus can be easily acquired. However, in a negative lead type zoom lens, a lens structure is likely to be asymmetric with respect to an aperture diaphragm, and therefore it is difficult to correct various aberrations. For example, it is difficult to reduce an aberration variation during focusing, which makes it very difficult to acquire high optical performance. In particular, with an inner focus method that performs focusing with a lens unit located at a position closer to an image than a first lens unit L1, a focus lens unit is easily made smaller and lighter and easily made to perform high-speed focusing, but an aberration variation during focusing is likely to increase. In order that good optical performance is realized while a size and a weight of the focus lens unit are reduced, it is important to properly set a power arrangement in each of lens units including the focus lens unit.

Japanese Patent Laid-Open No. ("JP") 2019-040029 discloses a zoom lens consisting of, in order from an object side to an image side, a first lens unit having a negative refractive power, a second lens unit having a positive refractive power, a third lens unit having a negative refractive power, and a fourth lens unit having a positive refractive power.

Although the zoom lens described in JP 2019-040029 realizes a small focus lens unit, optical performance thereof is insufficient.

SUMMARY OF THE INVENTION

The present disclosure provides a small zoom lens having good optical performance and an image pickup apparatus and an image pickup system having the zoom lens.

A zoom lens according to one aspect of the embodiments consists of, in order from an object side to an image side, a first lens unit having a negative refractive power, a second lens unit having a positive refractive power, and a rear group including one or more lens units. Each distance between adjacent lens units changes during zooming. The rear group includes a focus lens unit having a positive refractive power that moves from the image side to the object side during focusing from an infinite distance object to a close distance object. A lens closest to an object in the focus lens unit has a shape with a concave surface on the object side. The following inequalities are satisfied.

$$1.20 < fLP/fL2 < 3.20$$

$$-3.00 < fL1/fL2 < -0.85$$

fLP represents a focal length of the focus lens unit, fL1 represents a focal length of the first lens unit, and fL2 represents a focal length of the second lens unit.

An image pickup apparatus according to one aspect of the embodiments includes the zoom lens and an image sensor configured to receive light of an image formed by the zoom lens.

Further features of the present invention will become apparent from the following description of exemplary embodiments with reference to the attached drawings.

DESCRIPTION OF THE EMBODIMENTS

Figure 1:
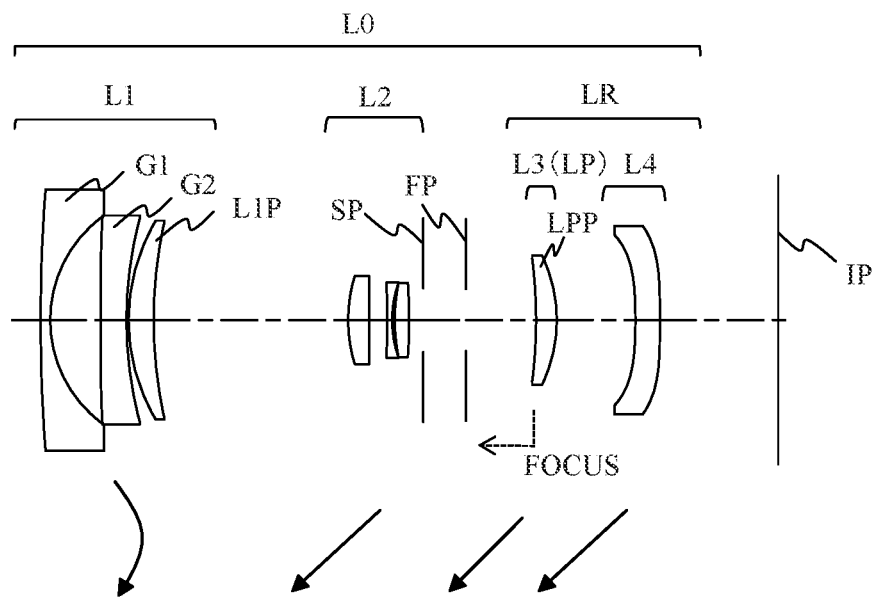
FIG. 1 is a lens sectional view of a zoom lens according to Example 1.
Figure 2A:
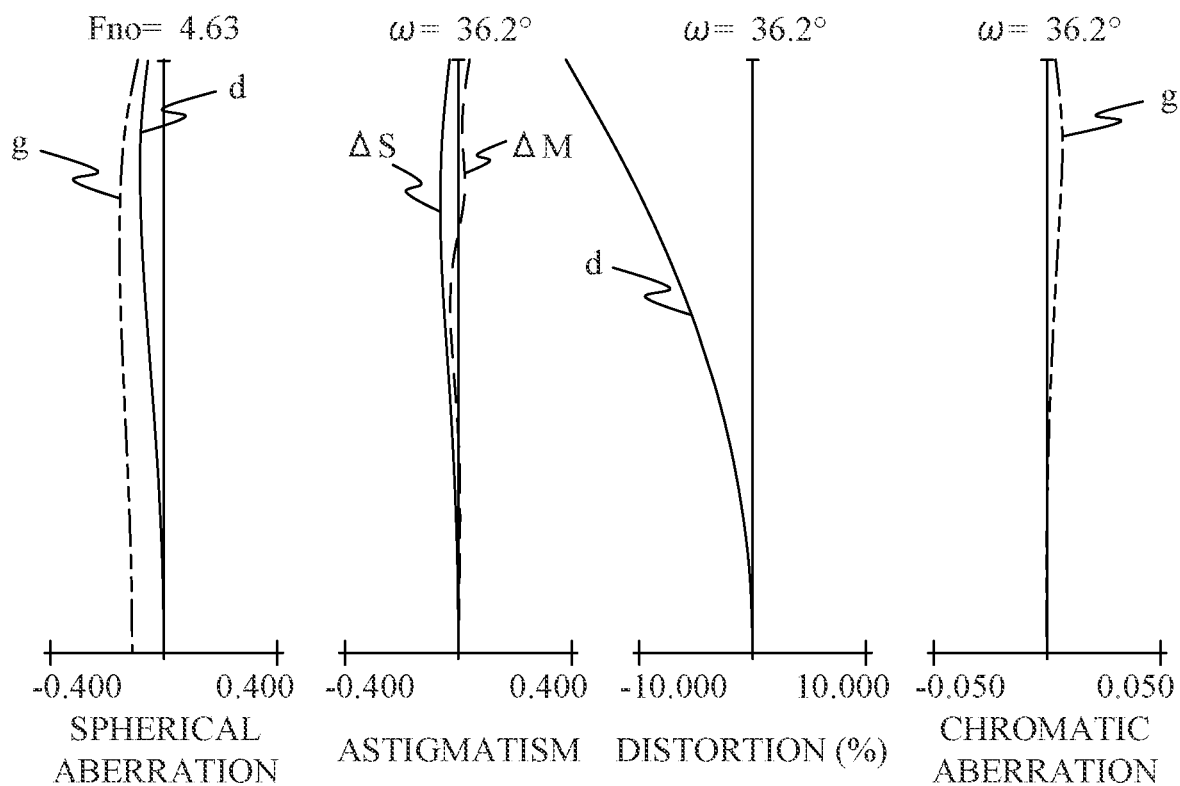
FIGS. 2A to 2C are aberration diagrams of the zoom lens according to Example 1.
Figure 2B:
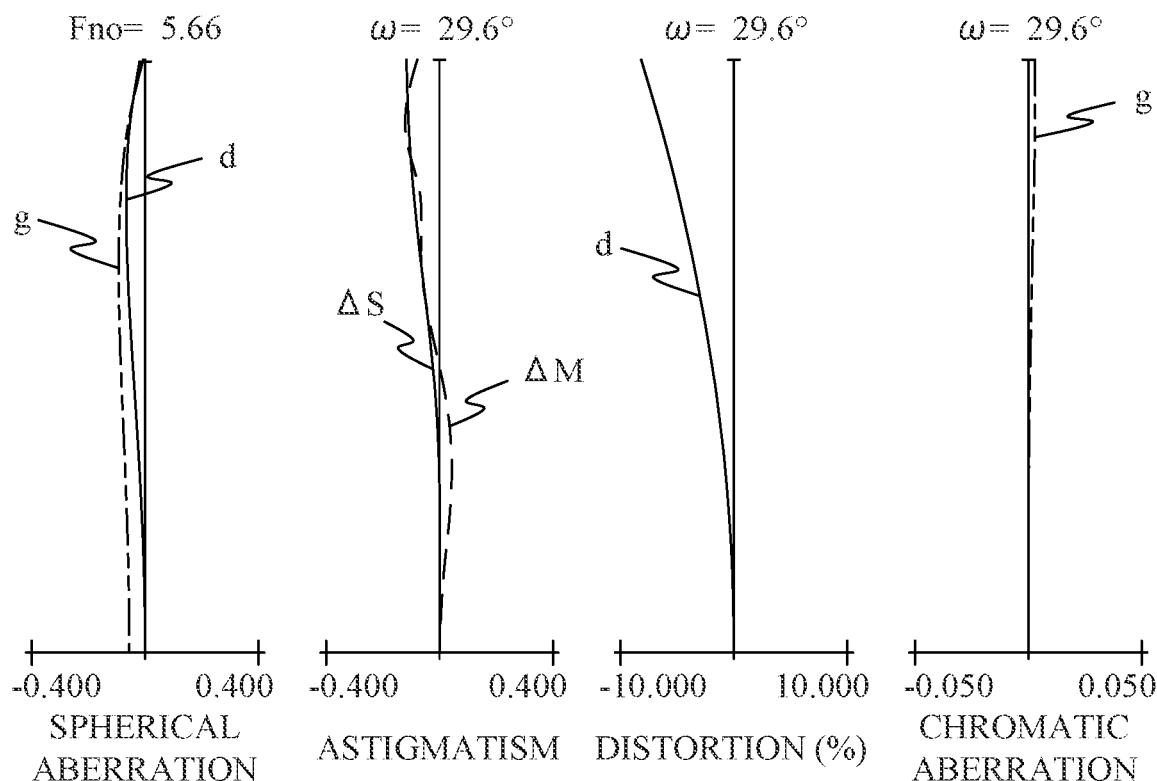
Figure 2C:
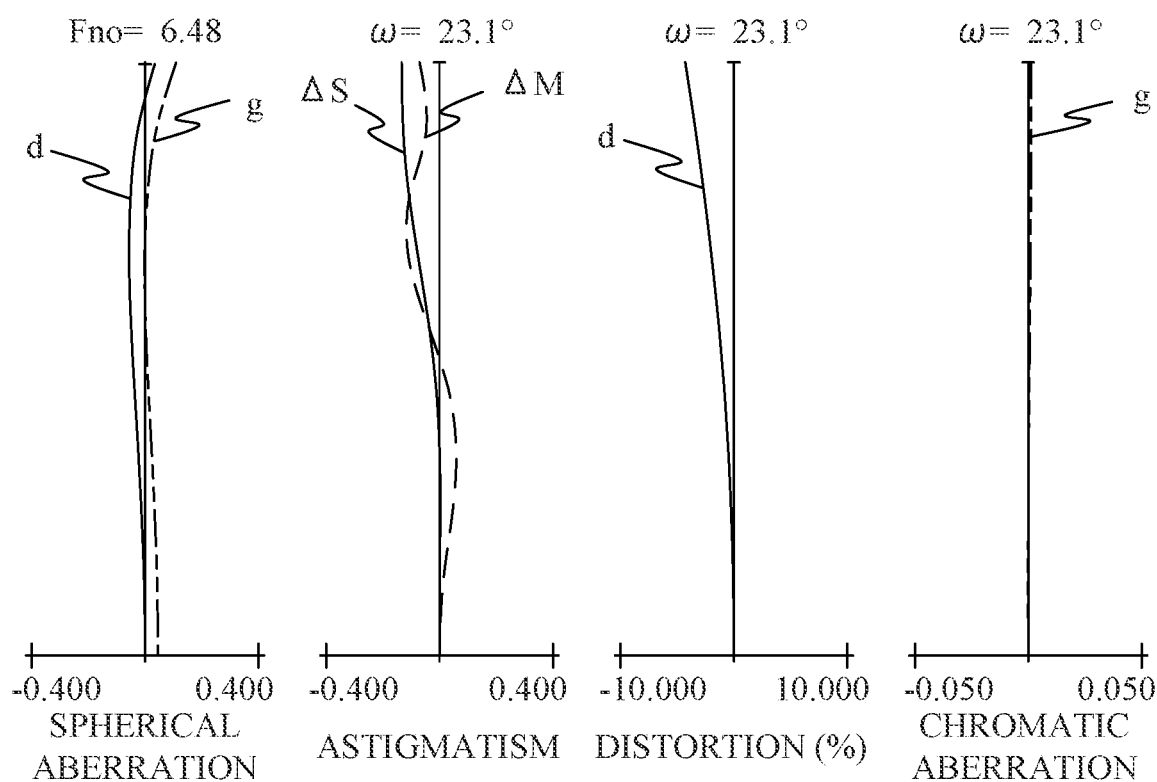
Figure 3:
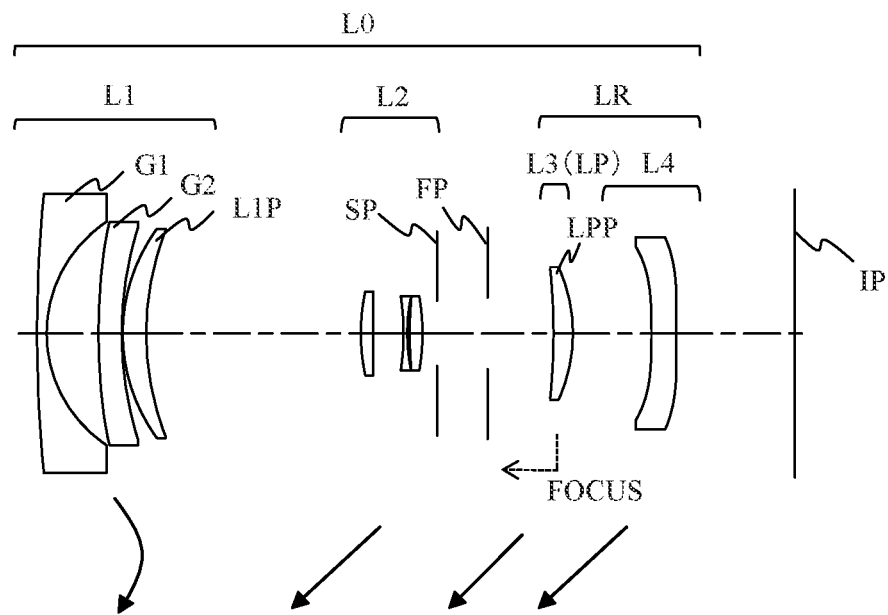
FIG. 3 is a lens sectional view of a zoom lens according to Example 2.
Figure 4A:
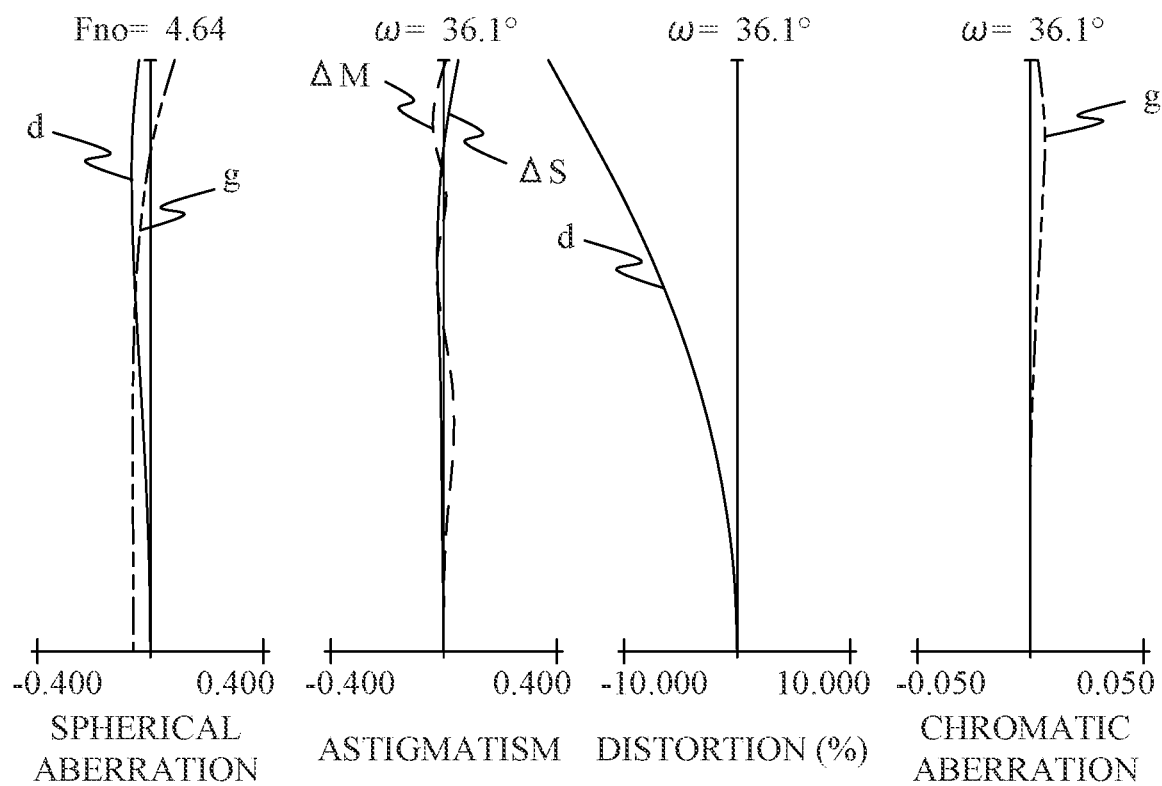
FIGS. 4A to 4C are aberration diagrams of the zoom lens according to Example 2.
Figure 4B:
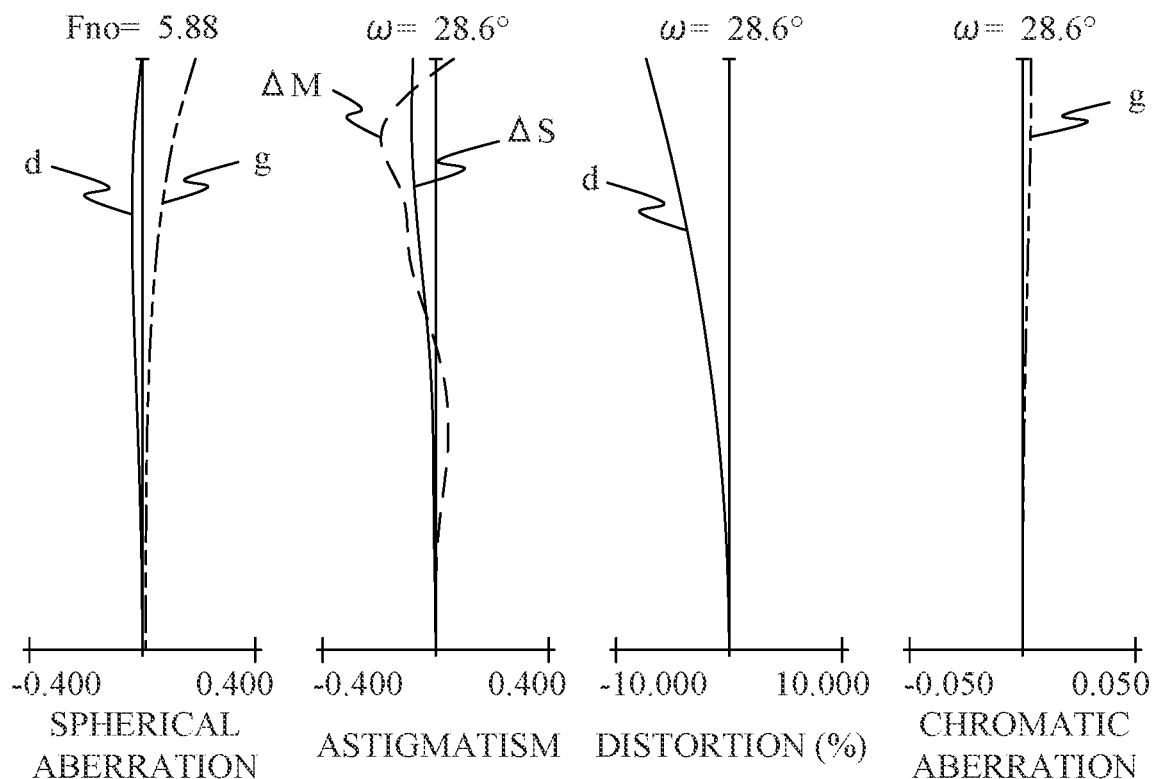
Figure 4C:
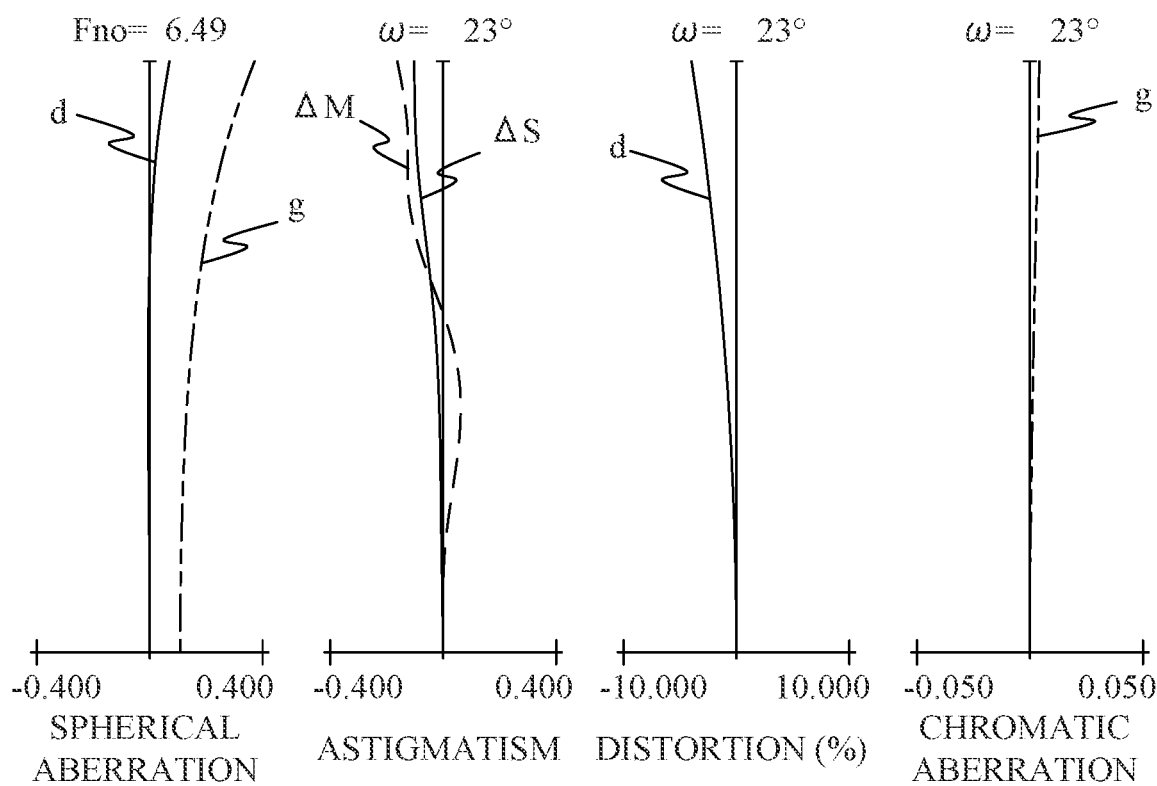
Figure 5:
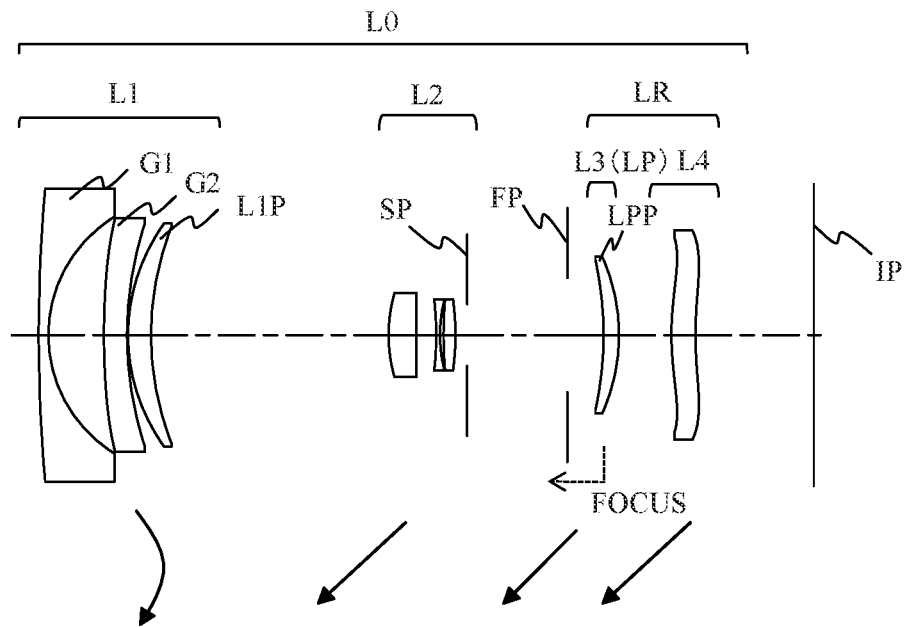
FIG. 5 is a lens sectional view of a zoom lens according to Example 3.
Figure 6A:
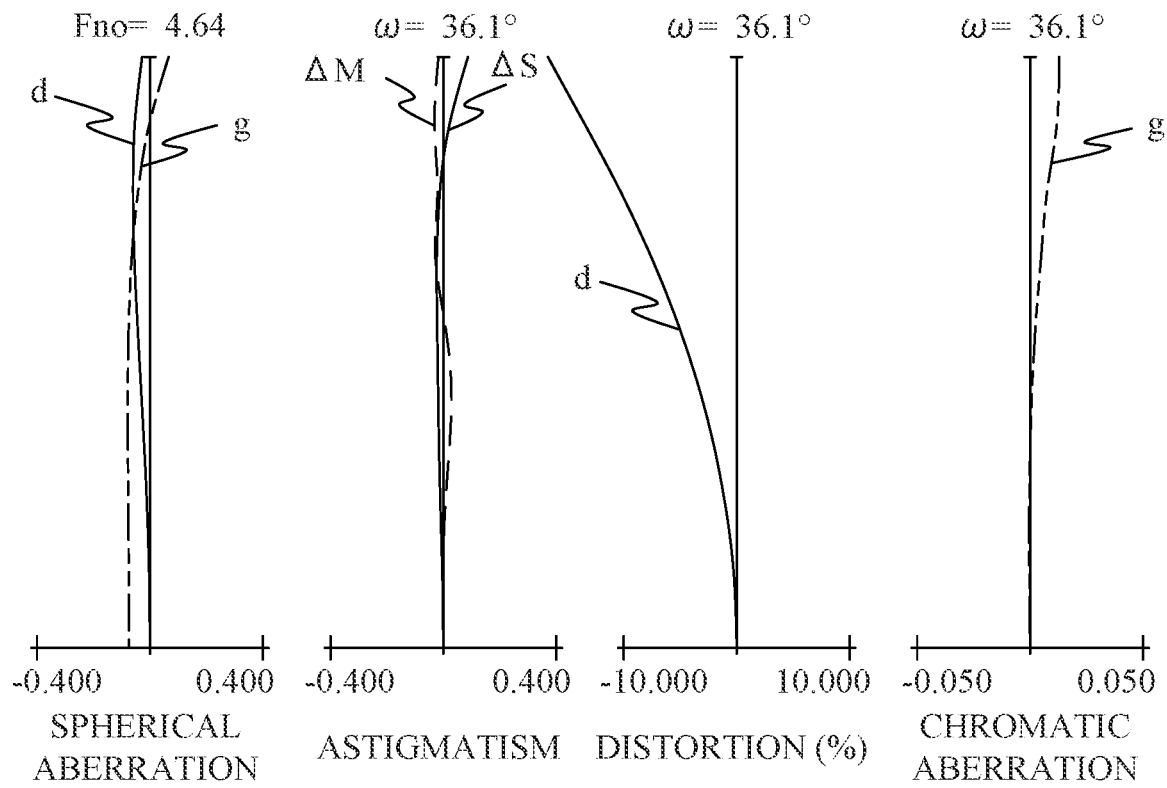
FIGS. 6A to 6C are aberration diagrams of the zoom lens according to Example 3.
Figure 6B:
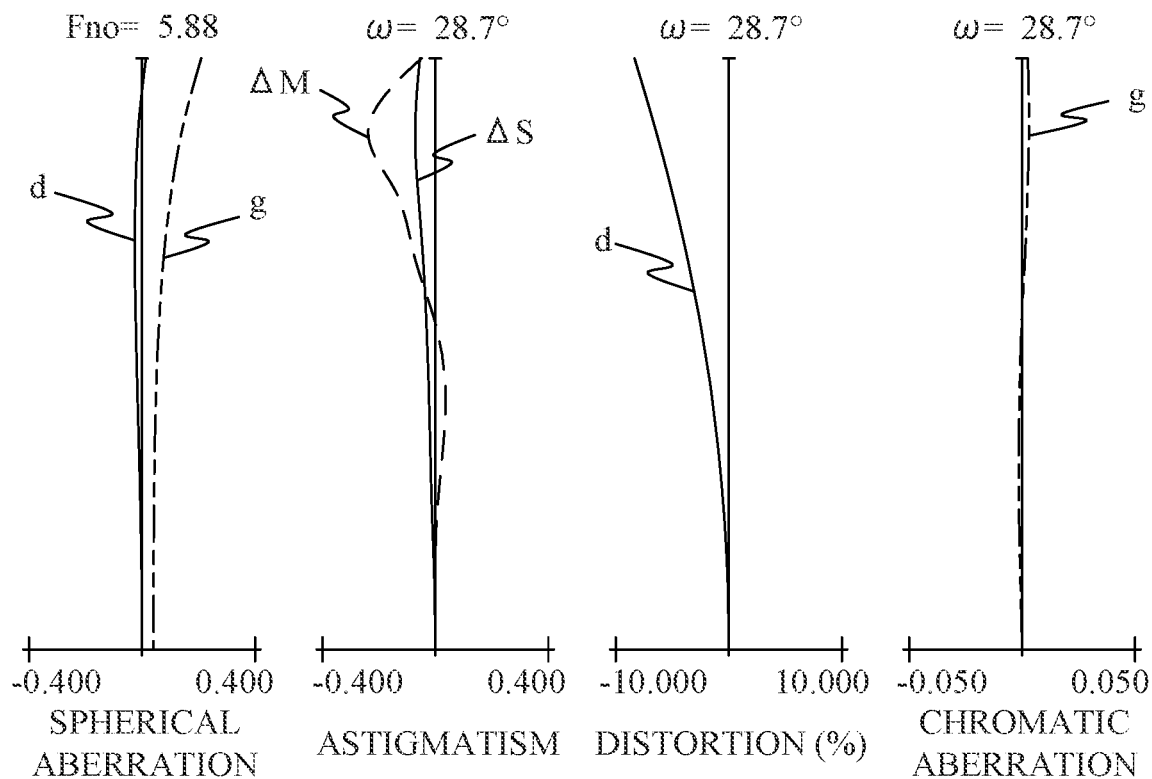
Figure 6C:
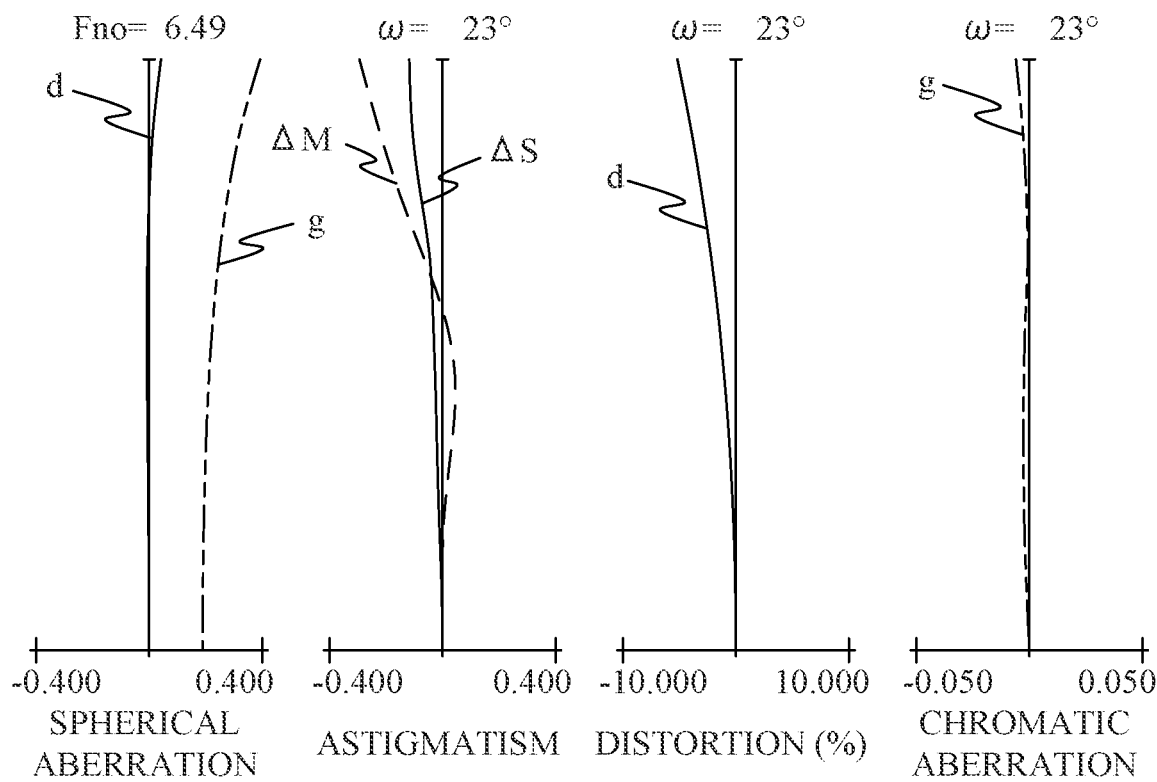
Figure 7:
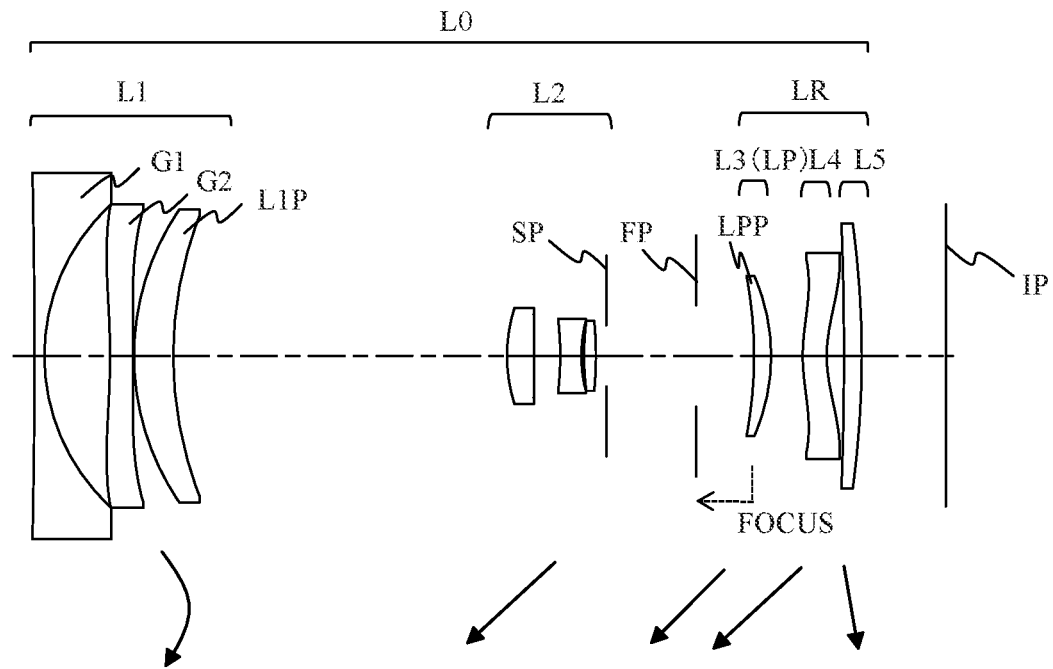
FIG. 7 is a lens sectional view of a zoom lens according to Example 4.
Figure 8A:
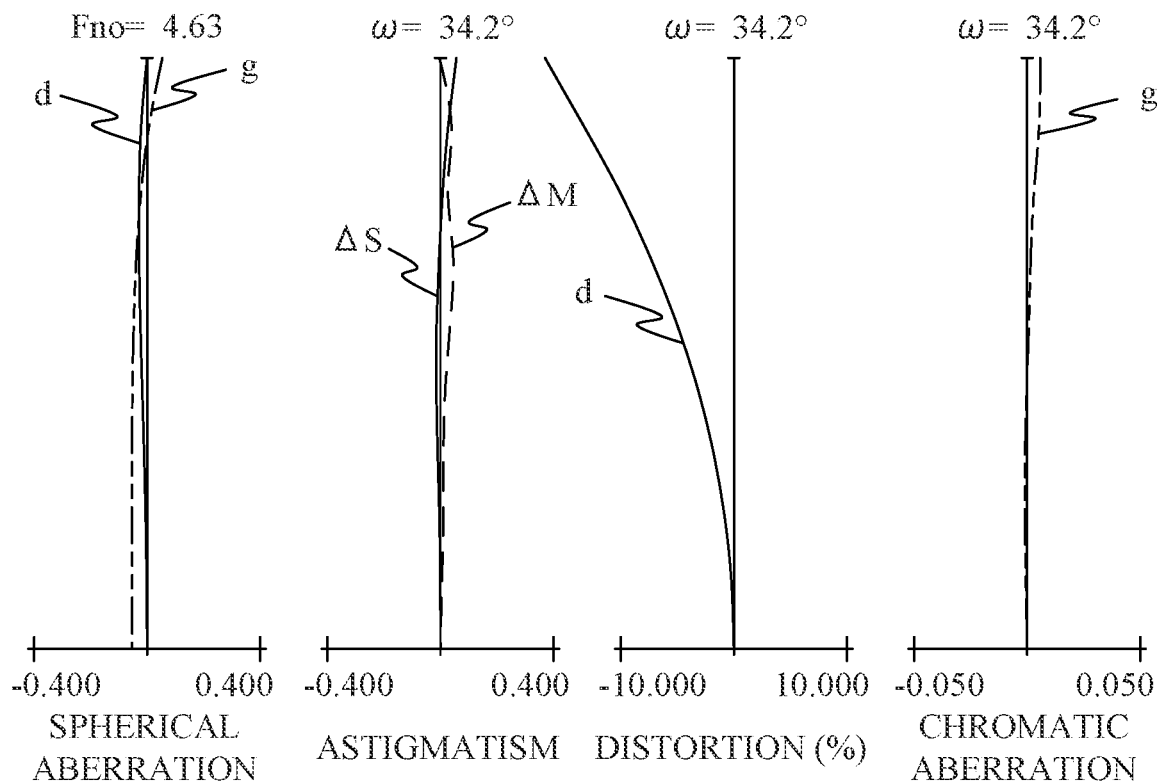
FIGS. 8A to 8C are aberration diagrams of the zoom lens according to Example 4.
Figure 8B:
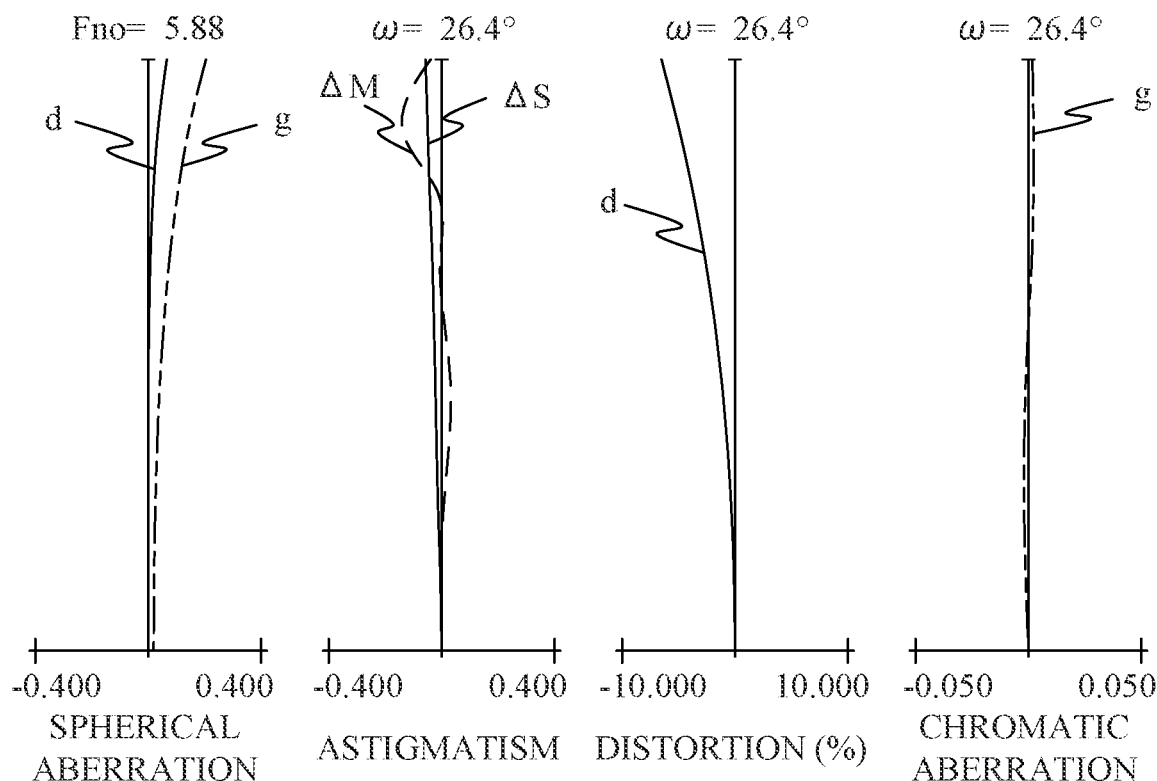
Figure 8C:
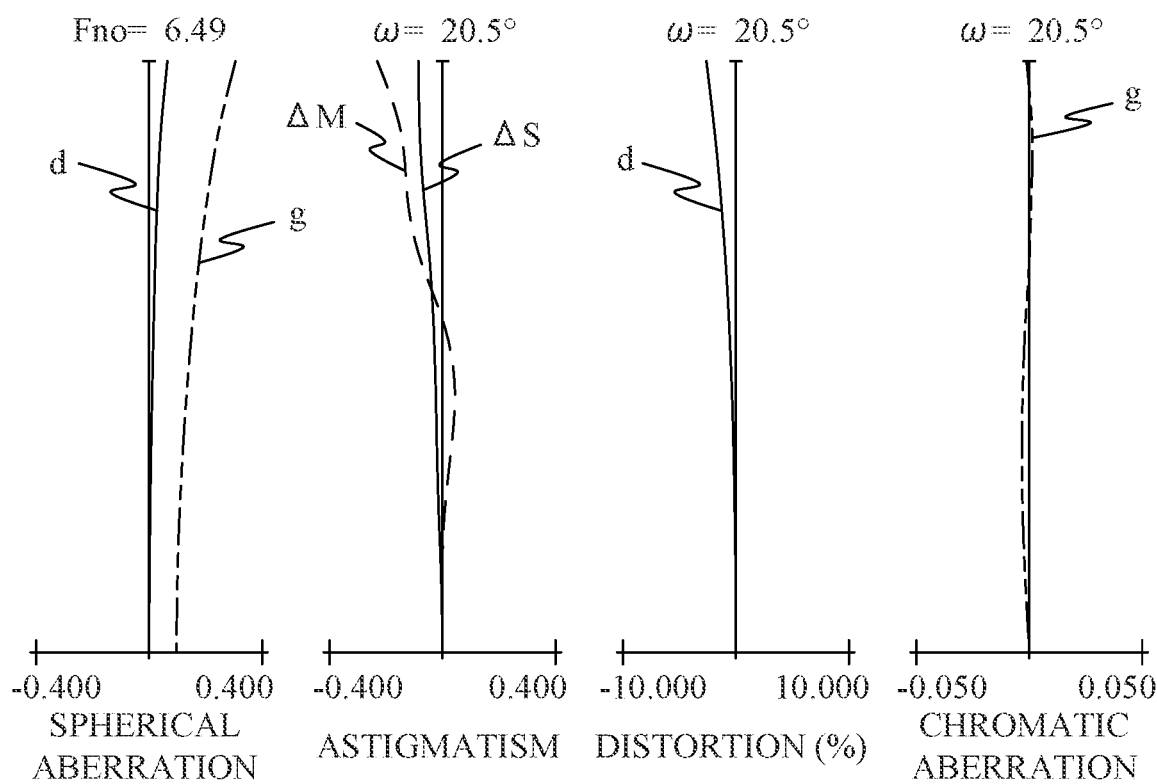
Figure 9:
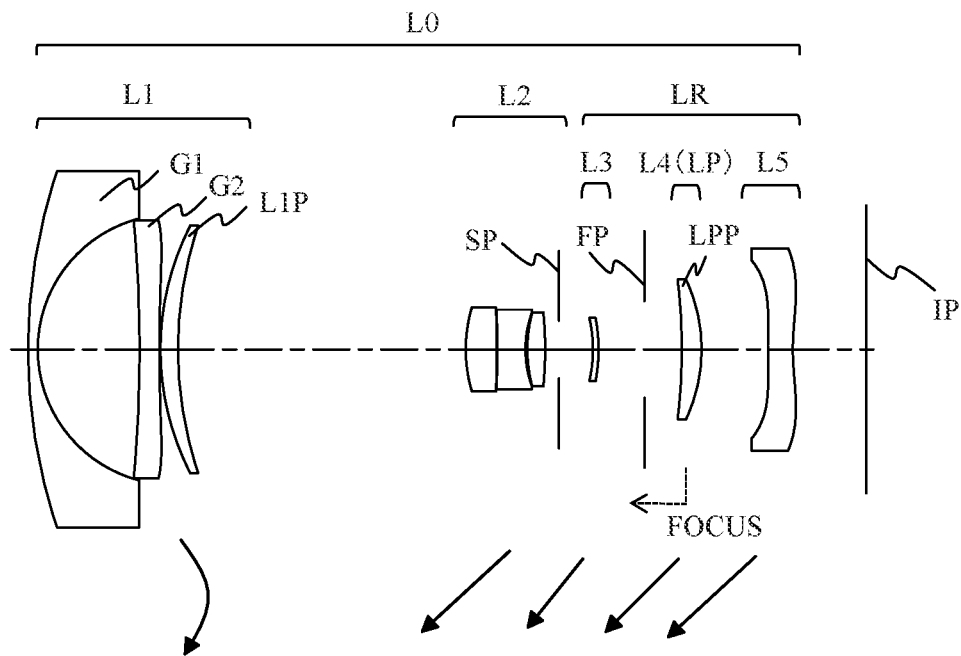
FIG. 9 is a lens sectional view of a zoom lens according to Example 5.
Figure 10A:
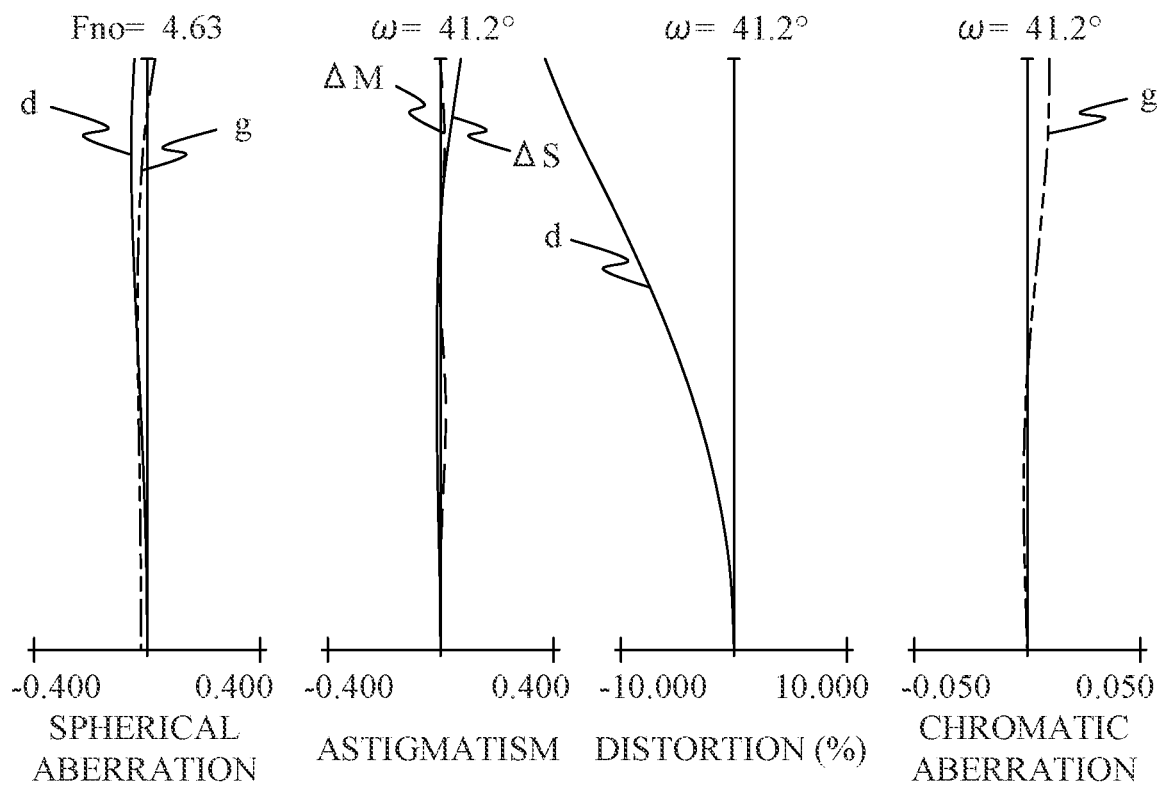
FIGS. 10A to 10C are aberration diagrams of the zoom lens according to Example 5.
Figure 10B:
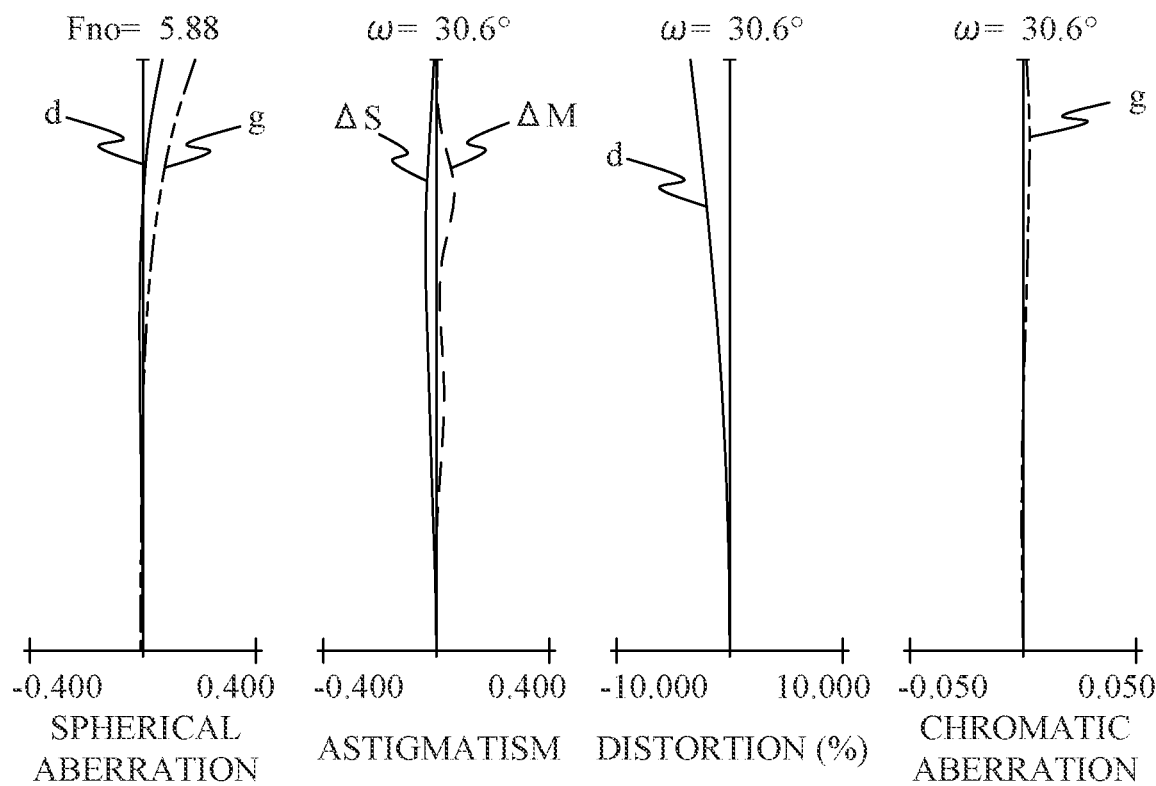
Figure 10C:
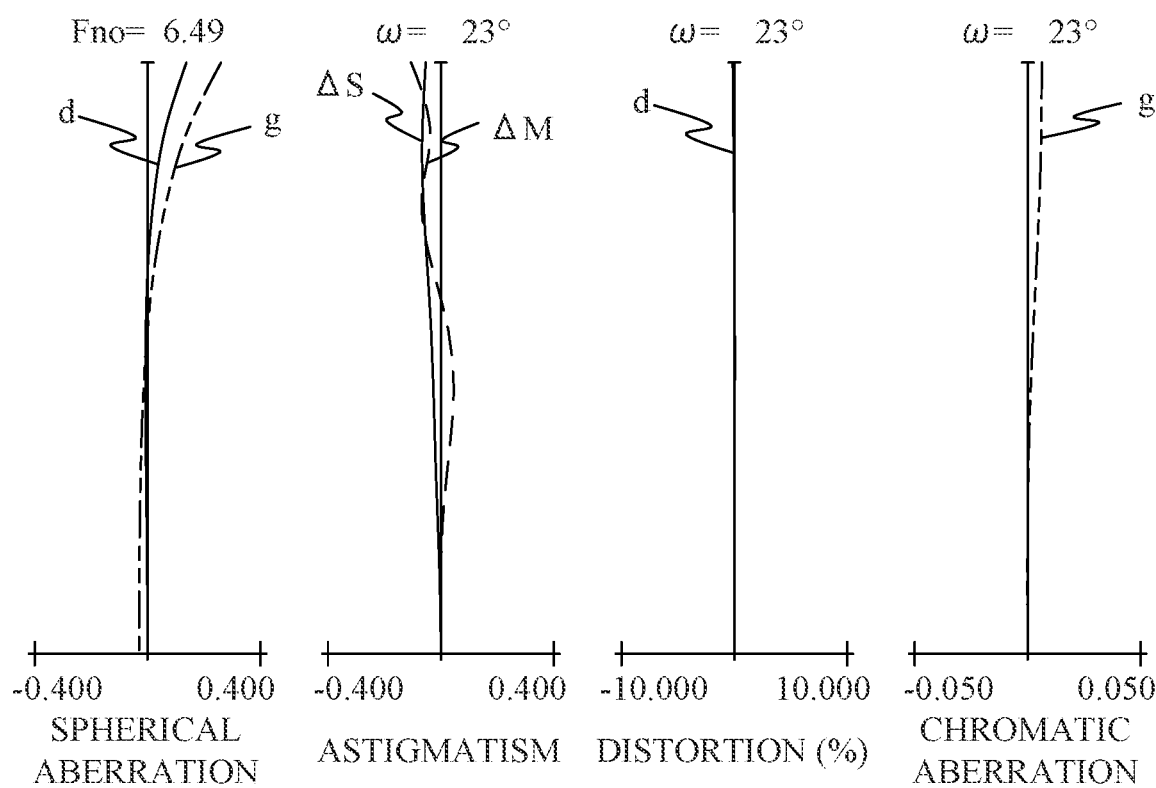
Figure 11:
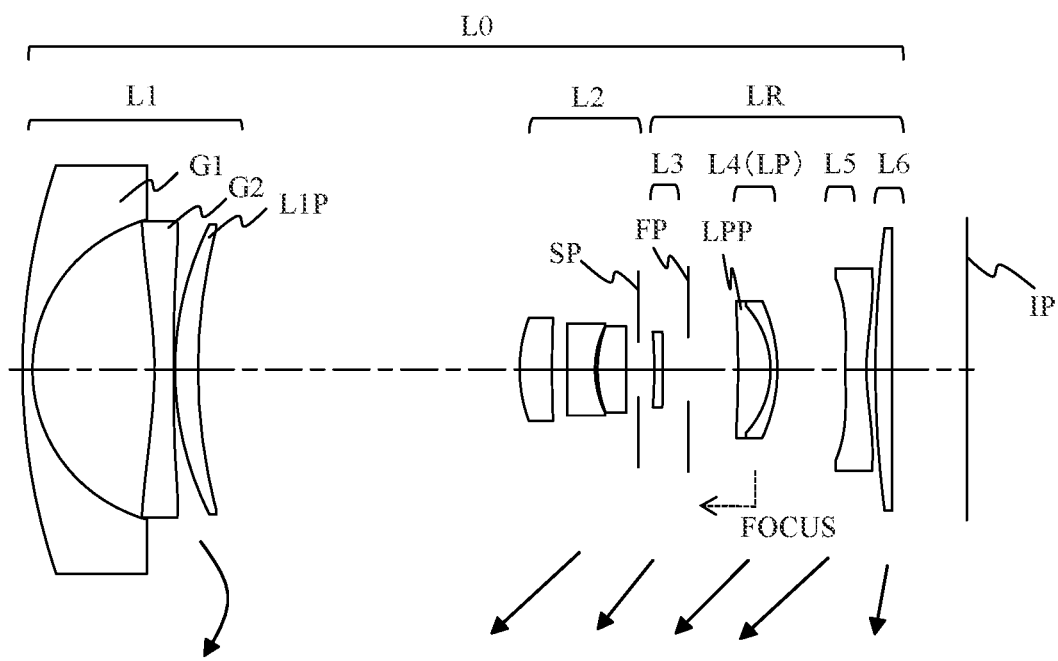
FIG. 11 is a lens sectional view of a zoom lens according to Example 6.
Figure 12A:
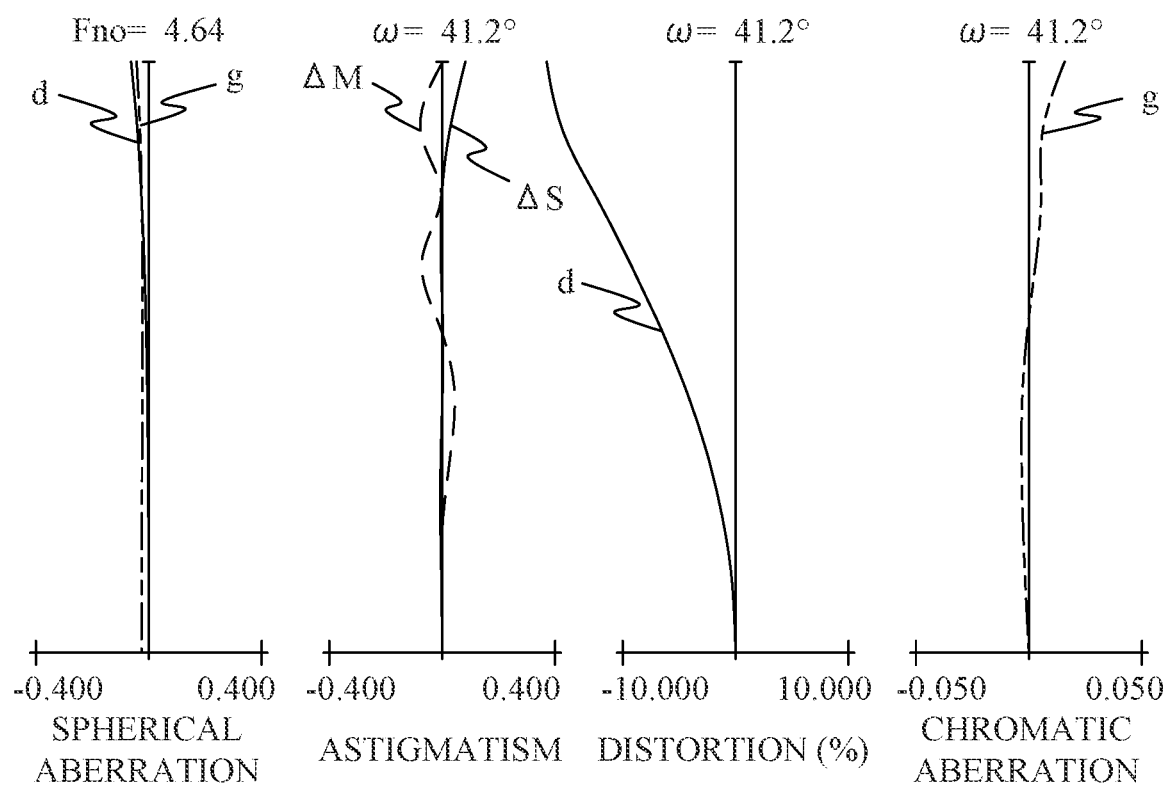
FIGS. 12A to 12C are aberration diagrams of the zoom lens according to Example 6.
Figure 12B:
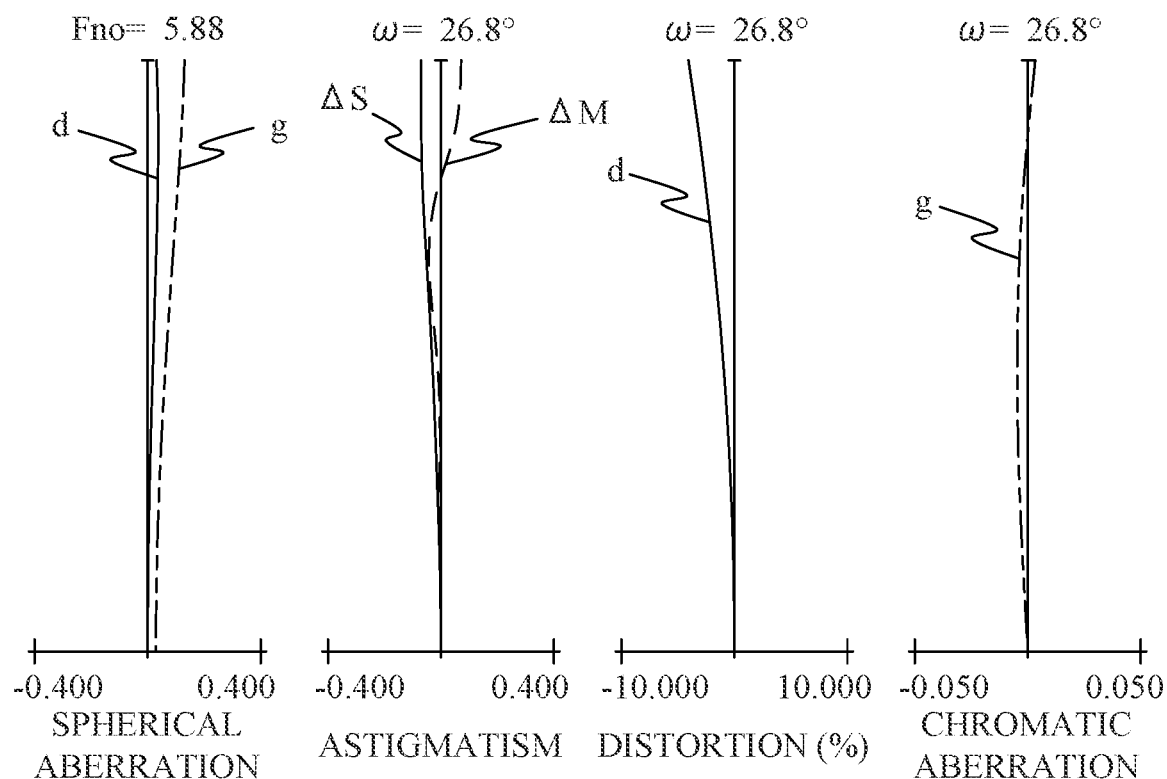
Figure 12C:
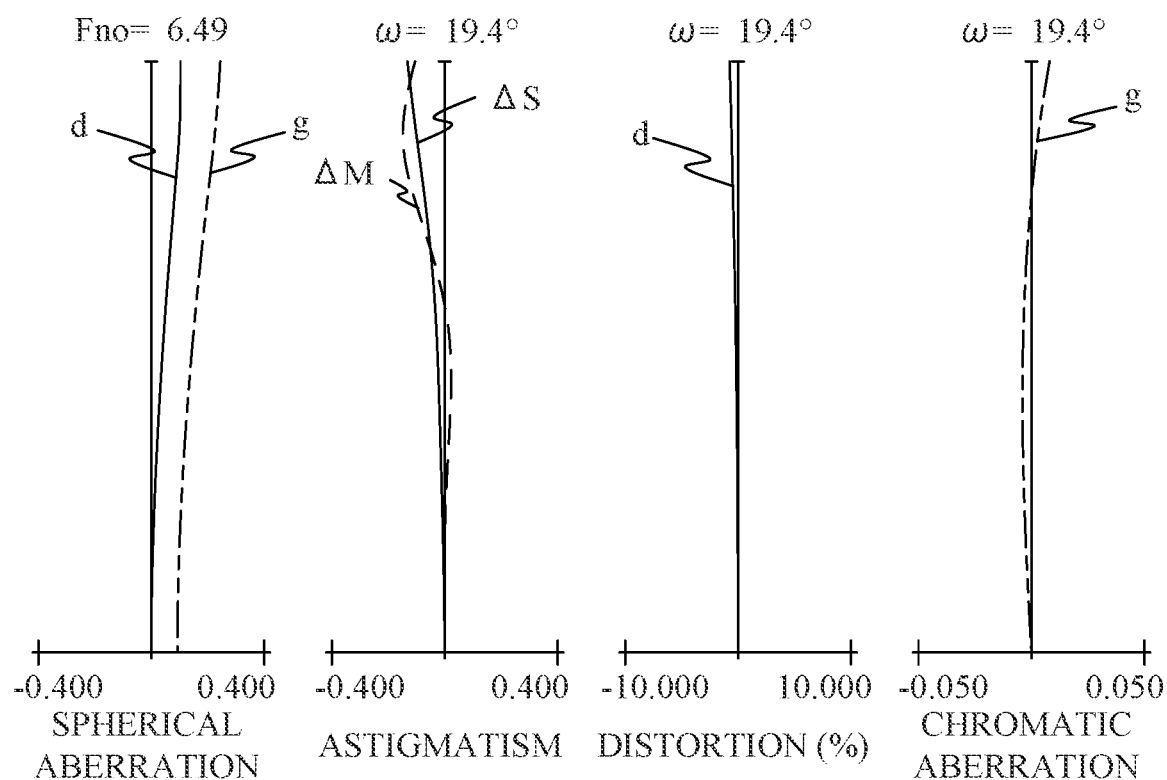

With reference to the accompanying drawings, a description is given of embodiments of a zoom lens and an image pickup apparatus having the zoom lens according to the present disclosure.

FIGS. 1, 3, 5, 7, 9, and 11 are lens sectional views of zoom lenses L0 according to Examples 1 to 6, respectively, and each illustrates the zoom lens L0 at a wide-angle end focusing on an infinite distance object (that is, an infinite distance object in-focus state). The zoom lens L0 according to each example is used in an image pickup apparatus, such as a digital video camera, a digital still camera, a broadcasting camera, a silver-halide film camera, and a surveillance camera, or an optical device including an interchangeable lens In each lens sectional view, the left side is an object side and the right side is an image side. The zoom lens L0 according to each example is configured to include a plurality of lens units. In the specification of the present application, a lens unit is a component of the zoom lens L0 and includes a single lens or a plurality of lenses. The lens unit may include an aperture diaphragm or a flare-cutting stop. In the zoom lens L0 according to each example, each distance between adjacent lens units changes during zooming from a wide-angle end to a telephoto end.

In each lens sectional view, a reference sign Li denotes an i-th (i is a natural number) lens unit counted from the object side among the lens units in the zoom lens L0. A reference sign SP denotes an aperture diaphragm. A reference sign FP denotes a flare-cutting filter that cuts unnecessary light. A reference sign IP denotes an image plane, and when the zoom lens L0 according to each example is used as an image pickup optical system for a digital still camera or a digital video camera, an image pickup plane of a solid image sensor (photoelectric conversion element) such as a CCD sensor and a CMOS sensor is disposed at the image plane IP. When the zoom lens L0 according to each example is used as an image pickup optical system for a silver-halide film camera, a photosensitive surface corresponding to a film surface is disposed at the image plane IP.

Solid arrows illustrated in each lens sectional view respectively represent simplified moving trajectories of the lens units during zooming from the wide-angle end to the telephoto end. In the specification of the present application, the wide-angle end and the telephoto end refer to zoom positions when each lens unit is positioned at one end and the other end of a mechanically movable range on an optical axis. A dotted arrow illustrated in each lens sectional view represents a simplified moving trajectory of a lens unit during focusing from an infinite distance object to a close distance object.

FIGS. 2A to 2C, FIGS. 4A to 4C, FIGS. 6A to 6C, FIGS. 8A to 8C, FIGS. 10A to 10C, and FIGS. 12A to 12C are aberration diagrams of the zoom lenses L0 according to Examples 1 to 6, respectively. Each aberration diagram illustrates aberration in the infinite distance object in-focus state. Each of the diagrams in FIGS. 2A, 4A, 6A, 8A, 10A, and 12A is an aberration diagram at the wide-angle end, each of the diagrams in FIGS. 2B, 4B, 6B, 8B, 10B, and 12B is an aberration diagram at an intermediate zoom position, and each of the diagrams in FIGS. 2C, 4C, 6C, 8C, 10C, and 12C is an aberration diagram at the telephoto end.

In each spherical aberration diagram, Fno denotes an F-number, and spherical aberration amounts with respect to a d-line (wavelength 587.6 nm) and a g-line (wavelength 435.8 nm) are illustrated. In each astigmatism diagram, ΔS denotes an astigmatism amount in a sagittal image plane, and ΔM denotes an astigmatism amount in a meridional image plane. Each distortion diagram illustrates a distortion amount with respect to the d-line. Each chromatic aberration diagram illustrates a chromatic aberration amount at the g-line. A reference sign ω denotes an image pickup half angle of view (°), which is an angle of view acquired by paraxial calculation.

Next, a description is given of a characteristic configuration in the zoom lens L0 according to each example.

The zoom lens L0 according to each example includes, in order from the object side to the image side, a first lens unit L1 having a negative refractive power, a second lens unit L2 having a positive refractive power, and a rear group LR including one or more lens units. The rear group LR includes all lens units disposed on the image side of the second lens unit L2. The zoom lens L0 is a zoom lens in which each distance between adjacent lens units changes during zooming. The rear group LR includes a lens unit LP (focus lens unit) that has a positive refractive power and moves from the image side to the object side during focusing from the infinite distance object to the close distance object In the zoom lens L0 according to each example, the first lens unit L1 may include, in order from the object side to the image side, a negative lens G1 (first negative lens) and a negative lens G2 (second negative lens).

In a case of an inner focus method, which performs focusing by using a lens unit disposed at a position closer to an image than a first lens unit L1, it is easy to reduce the size and the weight of the focus lens unit and to perform high-speed focusing, but an aberration variation during focusing is likely to increase. When good optical performance is to be realized while the size and the weight of the focus lens unit are reduced, respective power arrangements in lens units including the focus lens unit are to be properly set.

Therefore, in the zoom lens L0 according to each example, the focal length of each lens unit is properly set. Specifically, the zoom lens L0 according to each example satisfies the following inequality (1) and inequality (2).

$$1.20 < fLP/fL2 < 3.20 \quad (1)$$

$$-3.00 < fL1/fL2 < -0.85 \quad (2)$$

fLP represents a focal length of the lens unit LP, fL1 represents a focal length of the first lens unit L1, and fL2 represents a focal length of the second lens unit L2.

The inequality (1) relates to a ratio between the focal length fLP of the lens unit LP and the focal length fL2 of the second lens unit L2. If the value is smaller than the lower limit value of the inequality (1), the refractive power of the lens unit LP is so strong that it is difficult to reduce variations during focusing in various aberrations including spherical aberration. On the other hand, if the value is larger than the upper limit value of the inequality (1), the refractive power of the lens unit LP is so weak that a moving amount during focusing increases.

The inequality (2) relates to a ratio between the focal length fL1 of the first lens unit L1 and the focal length fL2 of the second lens unit L2. If the value is smaller than the lower limit value of the inequality (2), the refractive power of the first lens unit L1 is so weak that it is difficult to reduce the size of the zoom lens. On the other hand, if the value is larger than the upper limit value of the inequality (2), the negative refractive power of the first lens unit L1 is so strong that off-axis aberration, such as coma and field curvature, occurring in the first lens unit L1 increases, which makes it difficult to sufficiently correct the aberrations.

The above-described configurations can provide a small zoom lens having good optical performance.

The numerical ranges of the inequalities (1) and (2) may be set to numerical ranges of the following inequalities (1a) and (2a).

$$1.30 < fLP/fL2 < 3.10 \quad (1a)$$

$$-2.50 < fL1/fL2 < -0.90 \quad (2a)$$

The numerical ranges of the inequalities (1a) and (2a) may be set to numerical ranges of the following inequalities (1b) and (2b).

$$1.40 < fLP/fL2 < 3.05 \quad (1b)$$

$$-2.00 < fL1/fL2 < -0.95 \quad (2b)$$

Here, the zoom lens L0 according to each example is designed to allow distortion to occur. On the premise that the recently evolving electronic aberration correction technique is used, this image processing technique can correct deformation in an image caused by distortion. Therefore, an image pickup optical system including the zoom lens L0 includes a design value of the distortion amount occurring in the zoom lens L0. An electronic image captured by this image pickup optical system is corrected by image processing in an arbitrary image processing unit (for example, a CPU attached to an image pickup apparatus such as a camera body) using the design value of the distortion amount.

A zoom lens allowing distortion to occur does not require a lens to correct distortion, and therefore the size and the weight of the zoom lens can be easily reduced. Specifically, making an effective image pickup range (effective image circle diameter) of an image sensor at the wide-angle end smaller than an effective image pickup range (effective image circle diameter) of the image sensor at the telephoto end and correcting distortion as described above contribute to the reduction of a front lens diameter.

In the zoom lens L0 according to each example, part of the lenses or part of the lens units may function as an image stabilization optical system by parallelly shifting (moving) during image stabilization in a direction including a component orthogonal to the optical axis (the direction may be orthogonal to the optical axis). Further, a parallel planar plate having substantially no refractive power such as a low-pass filter, an infrared light cutting filter, and the like may be placed between a lens disposed at a position closest to an image and the image pickup plane.

Next, a description is given of conditions that may be satisfied in the zoom lens L0 according to each example.

The zoom lens L0 according to each example may satisfy one or more of the following inequalities (3) to (12).

$$0.25 < DSPw/TLw < 0.53 \quad (3)$$

$$1.40 < ndG1 < 1.69 \quad (4)$$

$$45 < vdG1 < 95 \quad (5)$$

$$1.40 < ndLPP < 1.65 \quad (6)$$

$$45 < vddLPP < 95 \quad (7)$$

$$1.60 < ndL1P < 2.10 \quad (8)$$

$$15 < vddL1P < 45 \quad (9)$$

$$0.50 < MLP/ML2 < 1.50 \quad (10)$$

$$0 \le fG1/fG2 < 0.42 \quad (11)$$

$$-3.00 < (G1R2+G1R1)/(G1R2-G1R1) < -0.10 \quad (12)$$

DSPw represents a distance on the optical axis from the aperture diaphragm SP to the image plane IP at the wide-angle end. TLw represents an overall lens length of the zoom lens L0 at the wide-angle end. ndG1 represents a refractive index of the negative lens G1 with respect to the d-line, and vdG1 represents an Abbe number of the negative lens G1 with respect to the d-line. ndLPP represents a refractive index with respect to the d-line of a positive lens LPP having the strongest positive refractive power (largest positive refractive power value) in the lens unit LP. A refractive power is represented by a reciprocal of a focal length, and a strong refractive power refers to that a value of a reciprocal of a focal length is large (value of a focal length is small). vddLPP represents an Abbe number with respect to the d-line of the positive lens LPP having the strongest positive refractive power (largest positive refractive power value) in the lens unit LP. ndL1P represents a refractive index with respect to the d-line of a positive lens L1P having the strongest positive refractive power (largest positive refractive power value) in the first lens unit L1. vddL1P represents an Abbe number with respect to the d-line of the positive lens L1P having the strongest positive refractive power (largest positive refractive power value) in the first lens unit L1. MLP represents a moving amount of the lens unit LP in a state where an infinite distance object is focused on during zooming from the wide-angle end to the telephoto end. It is assumed that a sign of the moving amount is negative if the lens unit LP is located on the object side at the telephoto end with respect to a position of the lens unit LP at the wide-angle end and is positive when the lens unit LP is located on the image side at the telephoto end with respect to a position of the lens unit LP at the wide-angle end. ML2 represents a moving amount of the second lens unit L2 during zooming from the wide-angle end to the telephoto end. A sign of the moving amount is assumed to be negative when the second lens unit L2 is located on the object side at the telephoto end with respect to a position of the second lens unit L2 at the wide-angle end and to be positive when the second lens unit L2 is located on the image side at the telephoto end with respect to a position of the second lens unit L2 at the wide-angle end. fG1 represents a focal length of the negative lens G1, and fG2 represents a focal length of the negative lens G2. G1R2 represents a curvature radius of an image-side lens surface (lens surface on the image side) of the negative lens G1, and G1R1 represents a curvature radius of an object-side lens surface (lens surface on the object side) of the negative lens G1.

The inequality (3) relates to a ratio between the distance DSPw on the optical axis from the aperture diaphragm SP to the image plane IP at the wide-angle end and the overall lens length TLw at the wide-angle end. Placing the aperture diaphragm SP at a proper position makes it easy to reduce the size of the zoom lens L0 while the diameter of the aperture diaphragm SP is reduced. If the distance from the aperture diaphragm SP to the image plane IP is so short that the value is smaller than the lower limit value of the inequality (3), an outer diameter of a lens placed on the object side of the aperture diaphragm SP is likely to be large. This makes it difficult to reduce the size of the zoom lens L0. On the other hand, if the distance from the aperture diaphragm SP to the image plane IP is so long that the value is larger than the upper limit value of the inequality (3), a light beam having diverged in the first lens unit L1 enters the aperture diaphragm SP without converging. Therefore, it is difficult to reduce the diameter of the aperture diaphragm SP, which makes it difficult to reduce the size of the zoom lens L0.

The inequality (4) relates to the refractive index ndG1 of the negative lens G1. If the value is smaller than the lower limit value of the inequality (4), since the refractive index is small, a glass material with a small specific gravity is likely to be used. This is effective for reducing the weight of the zoom lens L0, but the size reduction becomes difficult because the refractive power is small. If the value is larger than the upper limit value of the inequality (4), the specific gravity of the lens is large, which makes weight reduction difficult.

The inequality (5) relates to the Abbe number vdG1 of the negative lens G1 with respect to the d-line. If the value is smaller than the lower limit value of the inequality (5), it is difficult to correct lateral chromatic aberration. If the value is larger than the upper limit value of the inequality (5), lateral chromatic aberration is overcorrected.

The inequality (6) relates to the refractive index ndLPP with respect to the d-line of the positive lens LPP having the strongest positive refractive power in the lens unit LP. If the value is smaller than the lower limit value of the inequality (6), since the refractive index of the positive lens LPP is too small, the curvature radius of its lens surface is made to small so that a proper refractive power is acquired. This makes it difficult to correct various aberrations including spherical aberration. On the other hand, if the value is larger than the upper limit value of the inequality (6), a specific gravity of the positive lens LPP is likely to be large, which makes weight reduction difficult.

The inequality (7) relates to the Abbe number vddLPP with respect to the d-line of the positive lens LPP having the strongest positive refractive power in the lens unit LP. If the value is smaller than the lower limit value of the inequality (7), it is difficult to correct lateral chromatic aberration and on-axis chromatic aberration. If the value is larger than the upper limit value of the inequality (7), lateral chromatic aberration and on-axis chromatic aberration is overcorrected.

The inequality (8) relates to the refractive index ndL1P with respect to the d-line of the positive lens L1P having the strongest positive refractive power in the first lens unit L1. If the refractive index of the positive lens L1P is larger than the upper limit value of the inequality (8), a Petzval sum of the entire lens system is so small that it is difficult to correct field curvature. On the other hand, if the refractive index of the positive lens L1P is smaller than the value of the lower limit value of the inequality (8), the Petzval sum of the entire lens system is so large that it is difficult to correct field curvature. Furthermore, the curvature radius of the lens surface is made small so that proper refractive power is acquired, which makes it difficult to correct off-axis aberration including coma.

The inequality (9) relates to the Abbe number vddL1P with respect to the d-line of the positive lens L1P having the strongest positive refractive power in the first lens unit L1. If the value is smaller than the lower limit value of the inequality (9), it is difficult to correct lateral chromatic aberration. On the other hand, if the value is larger than the upper limit value of the inequality (9), correction is insufficient for lateral chromatic aberration and on-axis chromatic aberration.

The inequality (10) relates to a ratio between the moving amount MLP of the lens unit LP during zooming from the wide-angle end to the telephoto end in a state where an infinite distance object is focused on and the moving amount ML2 of the second lens unit L2 during zooming from the wide-angle end to the telephoto end. If the value is smaller than the lower limit value of the inequality (10), since the moving amount of the second lens unit L2 is large, the overall lens length at the wide-angle end increases. On the other hand, if the value is larger than the upper limit value of the inequality (10), since the moving amount of the second lens unit L2 is small, the refractive power of the second lens unit L2 is strengthened so that a desired magnification variation ratio is acquired. This makes it difficult to reduce variations in various aberrations including spherical aberration during zooming.

The inequality (11) relates to a ratio between the focal length fG1 of the negative lens G1 and the focal length fG2 of the negative lens G2. If the value is smaller than the lower limit value of the inequality (11), one of the negative lens G1 and the negative lens G2 is a positive lens, which makes it difficult to widen the angle of view. In a case where an absolute value of the focal length of the negative lens G1 is excessively smaller than the absolute value of the focal length of the negative lens G2, it may be difficult to achieve both widening of the angle of view and improvement of performance, and therefore the lower limit value the inequality (11) may be set to a value larger than zero, as described below. If the value is larger than the upper limit value of the inequality (11), the refractive power of the negative lens G1 is weak, which makes it difficult to reduce the size of the zoom lens L0. Otherwise, the refractive power of the negative lens G2 is strong, which makes it difficult to correct off-axis aberration such as field curvature.

The inequality (12) relates to the shape of the negative lens G1. If the value is smaller than the lower limit value of the inequality (12), since the negative lens G1 has a negative refractive power, the shape of the negative lens G1 is a meniscus shape convex toward the object side and is a shape with weak refractive power. Hence, the refractive power of the negative lens G1 is insufficient, and therefore a refractive power of a lens on the image side of the negative lens G1 is strengthened, which makes it difficult to correct off-axis aberration such as field curvature. On the other hand, if the value is larger than the upper limit value of the inequality (12), the negative lens G1 has a shape convex toward both sides or a meniscus shape convex toward the image side, and a curvature radius of an object-side surface of the negative lens G1 becomes small. This increases off-axis aberration, such as field curvature, occurring on the object-side surface of the negative lens G1 and makes it difficult to correct the off-axis aberration. Otherwise, the negative lens G1 has a shape with a weak refractive power, which makes it difficult to correct off-axis aberration such as field curvature.

The numerical ranges of the inequalities (3) to (12) may be set to numerical ranges of the following inequalities (3a) to (12a).

$$0.28 < DSPw/TLw < 0.51 \quad (3a)$$

$$1.50 < ndG1 < 1.67 \quad (4a)$$

$$50 < vdG1 < 85 \quad (5a)$$

$$1.45 < ndLPP < 1.63 \quad (6a)$$

$$55 < vdLPP < 90 \quad (7a)$$

$$1.65 < ndL1P < 2.05 \quad (8a)$$

$$18 < vdL1P < 40 \quad (9a)$$

$$0.60 < MLP/ML2 < 1.40 \quad (10a)$$

$$0.05 < fG1/fG2 < 0.41 \quad (11a)$$

$$-2.50 < (G1R2+G1R1)/(G1R2-G1R1) < -0.30 \quad (12a)$$

The numerical ranges of the inequalities (3) to (12) may be set to numerical ranges of the following inequalities (3b) to (12b).

$$0.30 < DSPw/TLw < 0.50 \quad (3b)$$

$$1.55 < ndG1 < 1.65 \quad (4b)$$

$$55 < vdG1 < 75 \quad (5b)$$

$$1.48 < ndLPP < 1.61 \quad (6b)$$

$$65 < vdLPP < 85 \quad (7b)$$

$$1.68 < ndL1P < 2.01 \quad (8b)$$

$$20 < vdL1P < 35 \quad (9b)$$

$$0.70 < MLP/ML2 < 1.30 \quad (10b)$$

$$0.09 < fG1/fG2 < 0.40 \quad (11b)$$

$$-2.00 < (G1R2+G1R1)/(G1R2-G1R1) < -0.50 \quad (12b)$$

Next, a description is given of configurations that may be satisfied in the zoom lens L0 according to each example.

The first lens unit L1 may consist of, in order from the object side to the image side, the negative lens G1, the negative lens G2, and the positive lens L1P. This facilitates correction of off-axis aberration such as field curvature at the wide-angle end.

At least one of the lens surfaces on the object side and the image side of the negative lens G2 may have an aspherical shape. This facilitates correction of off-axis aberration such as coma and field curvature at the wide-angle end.

The negative lens G2 may be made of a resin material. By using a resin material in the negative lens G2, which is likely to have a large lens outer diameter, the weight of zoom lens L0 is easily reduced.

There may be an air distance on the optical axis between the negative lens G1 and the negative lens G2, which facilitates correction of off-axis aberration such as coma and field curvature.

During image stabilization, the second lens unit L2 may be parallelly shifted (moved) in a direction including a component orthogonal to the optical axis (the direction may be orthogonal to the optical axis). By using the second lens unit L2 in which a light beam converges as the image stabilization lens unit, the size of the image stabilization lens unit is easily reduced.

The number of lenses in the second lens unit L2 may be three or less. This makes it easier to reduce the weight of the zoom lens L0.

The second lens unit L2 may include the aperture diaphragm SP, and the aperture diaphragm SP may be disposed at a position closest to an image in the second lens unit L2. Since a light beam converges on the image side in the second lens unit, the aperture diaphragm is easily made small.

Focusing from the infinite distance object to the close distance object may be performed by moving the lens unit LP that has the positive refractive power and is included in the rear group LR from the image side to the object side. An on-axis ray converges on the image side of the second lens unit L2. Thus, in this case, it is easy to reduce variations in various aberrations including spherical aberration during focusing.

The lens unit LP may consist of a single positive lens element having a meniscus shape with a concave surface on the object side. A single lens element is a single lens or a cemented lens. When the object side lens surface of the lens unit LP is a concave surface, an angle of an off-axis ray entering the lens surface can be reduced, making it easier to reduce variations in off-axis aberration such as field curvature during focusing.

Next, a detailed description is given of the zoom lens L0 according to each example.

The zoom lens L0 according to each of Example 1 and Example 2 includes the first lens unit L1, the second lens unit L2, a third lens unit L3 having a positive refractive power, and a fourth lens unit L4 having a negative refractive power. In the zoom lens L0 according to each of Example 1 and Example 2, the third lens unit L3 and the fourth lens unit L4 correspond to the rear group LR. During zooming from the wide-angle end to the telephoto end, the first lens unit L1 moves on a trajectory convex toward the image side, and the second lens unit L2, the third lens unit L3, and the fourth lens unit L4 monotonically move to the object side. In the zoom lens L0 according to each of Example 1 and Example 2, the second lens unit L2 and the fourth lens unit L4 move as a whole (on the same trajectory) during zooming. The third lens unit L3 corresponds to the lens unit LP having the positive refractive power, and the third lens unit L3 performs focusing from an infinite distance object point to a close distance object point by moving along the optical axis.

The zoom lens L0 according to Example 3 includes the first lens unit L1, the second lens unit L2, a third lens unit L3 having a positive refractive power, and a fourth lens unit L4 having a positive refractive power. In the zoom lens L0 according to Example 3, the third lens unit L3 and the fourth lens unit L4 correspond to the rear group LR. During zooming from the wide-angle end to the telephoto end, the first lens unit L1 moves on a trajectory convex toward the image side, and the second lens unit L2, the third lens unit L3, and the fourth lens unit L4 monotonically move to the object side. In the zoom lens L0 according to Example 3, the second lens unit L2 and the fourth lens unit L4 move as a whole (on the same trajectory) during zooming. The third lens unit L3 corresponds to the lens unit LP having the positive refractive power, and the third lens unit L3 performs focusing from an infinite distance object point to a close distance object point by moving along the optical axis.

The zoom lens L0 according to Example 4 includes the first lens unit L1, the second lens unit L2, a third lens unit L3 having a positive refractive power, a fourth lens unit L4 having a negative refractive power, and a fifth lens unit L5 having a positive refractive power. In the zoom lens L0 according to Example 4, the third lens unit L3, the fourth lens unit L4, and the fifth lens unit L5 correspond to the rear group LR. During zooming from the wide-angle end to the telephoto end, the first lens unit L1 moves on a trajectory convex toward the image side, the second lens unit L2, the third lens unit L3, and the fourth lens unit L4 monotonically move to the object side, and the fifth lens unit L5 monotonically moves to the image side. In the zoom lens L0 according to Example 4, the second lens unit L2 and the fourth lens unit L4 move as a whole (on the same trajectory) during zooming. The third lens unit L3 corresponds to the lens unit LP having the positive refractive power, and the third lens unit L3 performs focusing from an infinite distance object point to a close distance object point by moving along the optical axis.

The zoom lens L0 according to Example 5 includes the first lens unit L1, the second lens unit L2, a third lens unit L3 having a negative refractive power, a fourth lens unit L4 having a positive refractive power, and a fifth lens unit L5 having a negative refractive power. In the zoom lens L0 according to Example 5, the third lens unit L3, the fourth lens unit L4, and the fifth lens unit L5 correspond to the rear group LR. During zooming from the wide-angle end to the telephoto end, the first lens unit L1 moves on a trajectory convex toward the image side, and the second lens unit L2, the third lens unit L3, the fourth lens unit L4, and the fifth lens unit L5 monotonically move to the object side. In the zoom lens L0 according to Example 5, the second lens unit L2 and the fifth lens unit L5 move as a whole (on the same trajectory) during zooming. The fourth lens unit L4 corresponds to the lens unit LP having the positive refractive power, and the fourth lens unit L4 performs focusing from an infinite distance object point to a close distance object point by moving along the optical axis.

The zoom lens L0 according to Example 6 includes the first lens unit L1, the second lens unit L2, a third lens unit L3 having a negative refractive power, a fourth lens unit L4 having a positive refractive power, a fifth lens unit L5 having a negative refractive power, and a sixth lens L6 having the positive refractive power. In the zoom lens L0 according to Example 6, the third lens unit L3, the fourth lens unit L4, the fifth lens unit L5, and the sixth lens unit L6 correspond to the rear group LR. During zooming from the wide-angle end to the telephoto end, the first lens unit L1 moves on a trajectory convex toward the image side, and the second lens unit L2, the third lens unit L3, the fourth lens unit L4, the fifth lens unit L5, and the sixth lens unit L6 monotonically move to the object side. In the zoom lens L0 according to Example 6, the second lens unit L2 and the fifth lens unit L5 move as a whole (on the same trajectory) during zooming. The fourth lens unit L4 corresponds to the lens unit LP having the positive refractive power, and the fourth lens unit L4 performs focusing from an infinite distance object point to a close distance object point by moving along the optical axis.

Numerical Examples 1 to 6 respectively corresponding to Examples 1 to 6 are given below.

In surface data in each numerical example, r represents a curvature radius of each optical surface, and d (mm) represents an on-axis distance (distance on an optical axis) between an m-th surface and an (m+1)-th surface. m is a number of the surface counted from a light entering side. nd represents a refractive index with respect to the d-line of each optical member, and νd represents an Abbe number of each optical member. An Abbe number νd of a certain material is expressed by the following equation where Nd, NF, and NC represent refractive indexes with respect to the d-line (587.6 nm), an F-line (486.1 nm), and a C-line (656.3 nm) of Fraunhofer lines.

$$\nu d = (Nd-1)/(NF-NC)$$

In each numerical example, values of d, focal length (mm), F-number, and half angle of view(° are all values in a state where each zoom lens L0 according to the respective examples focuses on an object at an infinite distance. "Back Focus" is an air conversion length of a distance on the optical axis from a lens last surface (lens surface closest to an image) to a paraxial image plane. "Overall lens length" is a length acquired by adding the back focus to a distance on the optical axis from a foremost lens surface in the zoom lens L0 (lens surface closest to an object) to the last surface. "Lens Unit" is not limited to a configuration including a plurality of lenses, but may have a configuration consisting of a single lens.

In a case where an optical surface is an aspherical surface, a sign * is attached to a right side of a surface number. An aspherical shape is expressed by the following equation where X represents a displacement amount from a surface vertex in the optical axis direction, h represents a height from the optical axis in the direction orthogonal to the optical axis, R represents a paraxial curvature radius, K represents a conic constant, and A4, A6, A8, A10, and A12 represent aspherical surface coefficients of respective orders.

$$X = (h^2/R)/[1+[1-(1+K)(h/R)^2]^{1/2}] + A4 \times h^4 + A6 \times h^6 + A8 \times h^8 + A10 \times h^{10} + A12 \times h^{12}$$

"e±XX" in each aspherical surface coefficient represents "$\times 10^{\pm XX}$".

Numerical Example 1

Unit mm
SURFACE DATA

| Surface Number | r | d | nd | vd |
|---|---|---|---|---|
| 1 | 238.756 | 1.40 | 1.63854 | 55.4 |
| 2 | 18.479 | 7.21 | | |
| 3* | 994.673 | 3.70 | 1.53110 | 55.9 |
| 4 | 56.399 | 0.30 | | |
| 5 | 28.004 | 3.60 | 1.69895 | 30.1 |
| 6 | 65.231 | (Variable) | | |
| 7 | 21.644 | 3.00 | 1.90366 | 31.3 |
| 8 | −709.102 | 2.60 | | |
| 9 | −102.707 | 0.70 | 1.84666 | 23.9 |
| 10 | 16.164 | 0.37 | | |
| 11 | 26.583 | 2.05 | 1.77250 | 49.6 |
| 12 | −76.939 | 2.00 | | |
| 13 (Diaphragm) | ∞ | 6.15 | | |
| 14 | ∞ | (Variable) | | |
| 15 | −65.961 | 2.95 | 1.48749 | 70.2 |
| 16 | −21.205 | (Variable) | | |
| 17* | −90.404 | 3.50 | 1.53110 | 55.9 |
| 18* | −1111.779 | (Variable) | | |
| Image Plane | ∞ | | | |

ASPHERICAL SURFACE DATA

3rd Surface
K = 0.00000e+000 A 4 = 2.06228e−006
A 6 = −3.09541e−009 A 8 = 7.24904e−011
A10 = −3.07809e−013 A12 = 9.19241e−016
17th Surface
K = 0.00000e+000 A 4 = −1.01775e−004
A 6 = 1.71677e−007 A 8 = 1.83977e−010
A10 = −1.16025e−011 A12 = 2.80092e−014
18th Surface
K = 0.00000e+000 A 4 = −9.00719e−005
A 6 = 2.07355e−007 A 8 = −1.21619e−010
A10 = −4.95038e−012 A12 = 1.35424e−014

VARIOUS DATA
Zoom Ratio 1.96

| | 1.96 | Middle | Telephoto |
|---|---|---|---|
| Focal Length: | 24.71 | 35.01 | 48.53 |
| F-NUMBER: | 4.63 | 5.66 | 6.48 |
| Half Angle of View (°): | 36.23 | 29.55 | 23.08 |
| Image Height: | 18.10 | 19.85 | 20.68 |
| Overall Lens Length: | 105.60 | 98.52 | 99.03 |
| BF: | 16.94 | 25.84 | 37.19 |
| d 6 | 27.85 | 11.87 | 1.02 |
| d14 | 10.04 | 10.38 | 10.30 |
| d16 | 11.24 | 10.91 | 10.98 |
| d18 | 16.94 | 25.84 | 37.19 |

ZOOM LENS UNIT DATA

| Unit | Starting Surface | Focal Length |
|---|---|---|
| 1 | 1 | −40.14 |
| 2 | 7 | 39.51 |
| 3 | 15 | 62.75 |
| 4 | 17 | −185.51 |

Numerical Example 2

Unit mm
SURFACE DATA

| Surface Number | r | d | nd | vd |
|---|---|---|---|---|
| 1 | 194.836 | 1.40 | 1.63854 | 55.4 |
| 2 | 19.216 | 7.45 | | |
| 3* | 97.731 | 3.30 | 1.53110 | 55.9 |
| 4 | 50.481 | 0.15 | | |
| 5 | 25.378 | 3.36 | 1.74077 | 27.8 |
| 6 | 40.484 | (Variable) | | |
| 7 | 28.994 | 1.78 | 1.95375 | 32.3 |

-continued

| | | | | |
|---|---|---|---|---|
| 8 | −2837.037 | 4.32 | | |
| 9 | −36.870 | 0.55 | 1.80810 | 22.8 |
| 10 | 26.363 | 0.35 | | |
| 11 | 61.033 | 1.82 | 1.85150 | 40.8 |
| 12 | −30.900 | 2.06 | | |
| 13 (Diaphragm) | ∞ | (Variable) | | |
| 14 | ∞ | 9.45 | | |
| 15 | −87.219 | 2.77 | 1.48749 | 70.2 |
| 16 | −22.880 | (Variable) | | |
| 17* | −140.744 | 3.55 | 1.53110 | 55.9 |
| 18* | 244.765 | (Variable) | | |
| Image Plane | ∞ | | | |

ASPHERICAL SURFACE DATA

3rd Surface
$K = 0.00000e+000$ $A4 = 1.74257e-006$
$A6 = -2.46696e-009$ $A8 = 7.75729e-011$
$A10 = -3.31377e-013$ $A12 = 8.09051e-016$
17th Surface
$K = 0.00000e+000$ $A4 = -8.76708e-005$
$A6 = 1.10417e-007$ $A8 = 2.08926e-009$
$A10 = -3.00779e-011$ $A12 = 1.05365e-013$
18th Surface
$K = 0.00000e+000$ $A4 = -8.05410e-005$
$A6 = 2.07802e-007$ $A8 = 2.03128e-010$
$A10 = -8.66422e-012$ $A12 = 2.90115e-014$ VARIOUS DATA
Zoom Ratio 1.96

| | Wide Angle | Middle | Telephoto |
|---|---|---|---|
| Focal Length: | 24.72 | 36.55 | 48.52 |
| F-NUMBER: | 4.64 | 5.88 | 6.49 |
| Half Angle of View (°): | 36.09 | 28.56 | 23.01 |
| Image Height: | 18.02 | 19.90 | 20.61 |
| Overall Lens Length: | 108.53 | 98.64 | 98.06 |
| BF: | 16.96 | 26.55 | 36.14 |
| d 6 | 30.74 | 11.26 | 1.09 |
| d13 | 7.26 | 7.81 | 8.06 |
| d16 | 11.25 | 10.70 | 10.44 |
| d18 | 16.96 | 26.55 | 36.14 |

ZOOM LENS UNIT DATA

| Unit | Starting Surface | Focal Length |
|---|---|---|
| 1 | 1 | −44.09 |
| 2 | 7 | 41.43 |
| 3 | 14 | 62.74 |
| 4 | 17 | −167.72 |

Numerical Example 3

Unit mm
SURFACE DATA

| Surface Number | r | d | nd | vd |
|---|---|---|---|---|
| 1 | 232.845 | 1.40 | 1.62299 | 58.2 |
| 2 | 19.941 | 7.96 | | |
| 3* | 111.062 | 3.30 | 1.53110 | 55.9 |
| 4 | 51.120 | 0.15 | | |
| 5 | 27.285 | 3.28 | 1.85026 | 32.3 |
| 6 | 42.225 | (Variable) | | |
| 7 | 21.725 | 3.96 | 1.95375 | 32.3 |
| 8 | 1131.357 | 2.85 | | |
| 9 | −46.823 | 0.55 | 1.80810 | 22.8 |
| 10 | 20.233 | 0.51 | | |
| 11 | 60.580 | 1.70 | 1.80400 | 46.5 |
| 12 | −36.758 | 1.68 | | |

-continued

| | | | | |
|---|---|---|---|---|
| 13 (Diaphragm) | ∞ | (Variable) | | |
| 14 | ∞ | 5.20 | | |
| 15 | −49.571 | 2.22 | 1.49700 | 81.5 |
| 16* | −27.201 | (Variable) | | |
| 17* | 39.782 | 3.43 | 1.53110 | 55.9 |
| 18* | 50.673 | (Variable) | | |
| Image Plane | ∞ | | | |

ASPHERICAL SURFACE DATA

3rd Surface
$K = 0.00000e+000$ $A4 = 1.84216e-006$
$A6 = 8.01311e-010$ $A8 = 5.12283e-011$
$A10 = -2.30863e-013$ $A12 = 5.59343e-016$
17th Surface
$K = 0.00000e+000$ $A4 = -4.36850e-005$
$A6 = -1.04709e-007$ $A8 = 1.10943e-009$
$A10 = -6.81115e-012$ $A12 = 1.19305e-014$
18th Surface
$K = 0.00000e+000$ $A4 = -4.39901e-005$
$A6 = 9.00326e-008$ $A8 = 9.46107e-010$
$A10 = -5.28840e-012$ $A12 = 9.00245e-015$ VARIOUS DATA
Zoom Ratio 1.96

| | Wide Angle | Middle | Telephoto |
|---|---|---|---|
| Focal Length: | 24.71 | 36.32 | 48.52 |
| F-NUMBER: | 4.64 | 5.88 | 6.49 |
| Half Angle of View (°): | 36.10 | 28.72 | 23.02 |
| Image Height: | 18.02 | 19.90 | 20.62 |
| Overall Lens Length: | 111.00 | 99.87 | 98.01 |
| BF: | 16.96 | 26.97 | 36.98 |
| d 6 | 34.02 | 12.88 | 1.01 |
| d13 | 14.34 | 17.31 | 17.82 |
| d16 | 7.48 | 4.50 | 3.99 |
| d18 | 16.96 | 26.97 | 36.98 |

ZOOM LENS UNIT DATA

| Unit | Starting Surface | Focal Length |
|---|---|---|
| 1 | 1 | −46.24 |
| 2 | 7 | 38.99 |
| 3 | 14 | 117.40 |
| 4 | 17 | 314.18 |

Numerical Example 4

Unit mm
SURFACE DATA

| Surface Number | r | d | nd | vd |
|---|---|---|---|---|
| 1 | −1120.940 | 1.40 | 1.63854 | 55.4 |
| 2 | 29.481 | 9.39 | | |
| 3* | −105.871 | 3.30 | 1.53110 | 55.9 |
| 4* | −390.341 | 0.15 | | |
| 5 | 37.169 | 5.61 | 2.00100 | 29.1 |
| 6 | 55.239 | (Variable) | | |
| 7 | 22.578 | 3.84 | 1.85150 | 40.8 |
| 8 | −4398.814 | 3.78 | | |
| 9 | −49.047 | 3.04 | 1.76182 | 26.5 |
| 10 | 19.940 | 0.38 | | |
| 11 | 38.988 | 1.70 | 1.77250 | 49.6 |
| 12 | −50.780 | 1.49 | | |
| 13 (Diaphragm) | ∞ | (Variable) | | |
| 14 | ∞ | 8.31 | | |
| 15 | −60.430 | 2.44 | 1.53775 | 74.7 |
| 16 | −28.373 | (Variable) | | |
| 17* | 27.547 | 3.42 | 1.53110 | 55.9 |
| 18* | 19.381 | (Variable) | | |

-continued

| | | | | |
|---|---|---|---|---|
| 19 | −476.759 | 2.53 | 1.98612 | 16.5 |
| 20 | −139.384 | (Variable) | | |
| Image Plane | ∞ | | | |

ASPHERICAL SURFACE DATA

3rd Surface
K = 0.00000e+000 A 4 = 1.73506e−005
A 6 = −5.81504e−008 A 8 = 2.33643e−010
A10 = −4.73065e−013 A12 = 3.72284e−016
4th Surface
K = 2.78976e+002 A 4 = 1.77155e−005
A 6 = −5.73090e−008 A 8 = 2.47146e−010
A10 = −5.30598e−013 A12 = 4.44306e−016
17th Surface
K = 0.00000e+000 A 4 = −1.15240e−004
A 6 = 1.08980e−007 A 8 = 1.09284e−009
A10 = −9.51817e−012 A12 = 2.49887e−014
18th Surface
K = 0.00000e+000 A 4 = −1.42130e−004
A 6 = 2.49994e−007 A 8 = 5.94173e−011
A10 = −4.17813e−012 A12 = 1.06545e−014

VARIOUS DATA
Zoom Ratio 2.07

| | Wide Angle | Middle | Telephoto |
|---|---|---|---|
| Focal Length: | 26.52 | 40.09 | 55.00 |
| F-NUMBER: | 4.63 | 5.88 | 6.49 |
| Half Angle of View (°): | 34.19 | 26.40 | 20.54 |
| Image Height: | 18.02 | 19.90 | 20.61 |
| Overall Lens Length: | 130.02 | 109.61 | 101.49 |
| BF: | 11.57 | 11.28 | 11.00 |
| d 6 | 47.80 | 18.28 | 1.05 |
| d13 | 12.86 | 15.19 | 14.62 |
| d16 | 4.53 | 2.19 | 2.76 |
| d18 | 2.50 | 11.89 | 21.29 |
| d20 | 11.57 | 11.28 | 11.00 |

ZOOM LENS UNIT DATA

| Unit | Starting Surface | Focal Length |
|---|---|---|
| 1 | 1 | −66.85 |
| 2 | 7 | 42.89 |
| 3 | 14 | 96.88 |
| 4 | 17 | −144.01 |
| 5 | 19 | 199.00 |

Numerical Example 5

Unit mm
SURFACE DATA

| Surface Number | r | d | nd | vd |
|---|---|---|---|---|
| 1 | 80.208 | 1.40 | 1.63854 | 55.4 |
| 2 | 19.361 | 14.61 | | |
| 3* | −164.348 | 2.80 | 1.53110 | 55.9 |
| 4* | 253.136 | 0.15 | | |
| 5 | 38.801 | 2.51 | 1.92286 | 20.9 |
| 6 | 55.307 | (Variable) | | |
| 7 | 21.105 | 4.44 | 1.91082 | 35.3 |
| 8 | −157.113 | 0.10 | | |
| 9 | −95.832 | 4.01 | 1.85451 | 25.2 |
| 10 | 15.464 | 0.27 | | |
| 11 | 20.249 | 2.55 | 1.63930 | 44.9 |
| 12 | −54.619 | 1.98 | | |
| 13 (Diaphragm) | ∞ | (Variable) | | |
| 14 | −20.018 | 0.80 | 1.83481 | 42.7 |
| 15 | −24.304 | (Variable) | | |
| 16 | ∞ | 5.38 | | |

-continued

| | | | | |
|---|---|---|---|---|
| 17 | −79.509 | 2.82 | 1.49700 | 81.5 |
| 18 | −23.407 | (Variable) | | |
| 19* | 106.844 | 3.57 | 1.53110 | 55.9 |
| 20* | 35.485 | (Variable) | | |
| Image Plane | ∞ | | | |

ASPHERICAL SURFACE DATA

3rd Surface
K = 0.00000e+000 A 4 = 8.19088e−006
A 6 = −4.23962e−008 A 8 = 4.87158e−011
A10 = 2.63400e−013 A12 = −6.28278e−016
4th Surface
K = −1.79037e+002 A 4 = 6.17666e−006
A 6 = −5.09905e−008 A 8 = 3.25197e−011
A10 = 3.67841e−013 A12 = −9.82139e−016
19th Surface
K = 0.00000e+000 A 4 = −1.33629e−004
A 6 = 9.73781e−008 A 8 = 1.70352e−009
A10 = −1.81236e−011 A12 = 4.81540e−014
20th Surface
K = 0.00000e+000 A 4 = −1.31273e−004
A 6 = 3.10386e−007 A 8 = 7.12932e−012
A10 = −5.06314e−012 A12 = 1.39234e−014

VARIOUS DATA
Zoom Ratio 2.35

| | Wide Angle | Middle | Telephoto |
|---|---|---|---|
| Focal Length: | 20.61 | 33.70 | 48.50 |
| F-NUMBER: | 4.63 | 5.88 | 6.49 |
| Half Angle of View (°): | 41.17 | 30.56 | 23.03 |
| Image Height: | 18.02 | 19.90 | 20.61 |
| Overall Lens Length: | 120.00 | 104.38 | 100.66 |
| BF: | 10.49 | 20.91 | 31.34 |
| d 6 | 41.21 | 15.16 | 1.01 |
| d13 | 4.86 | 6.13 | 7.40 |
| d15 | 6.56 | 8.20 | 6.82 |
| d18 | 9.48 | 6.58 | 6.69 |
| d20 | 10.49 | 20.91 | 31.34 |

ZOOM LENS UNIT DATA

| Unit | Starting Surface | Focal Length |
|---|---|---|
| 1 | 1 | −45.32 |
| 2 | 7 | 32.92 |
| 3 | 14 | −148.57 |
| 4 | 16 | 65.65 |
| 5 | 19 | −101.81 |

Numerical Example 6

Unit mm
SURFACE DATA

| Surface Number | r | d | nd | vd |
|---|---|---|---|---|
| 1 | 91.050 | 1.40 | 1.63854 | 55.4 |
| 2 | 22.276 | 17.49 | | |
| 3* | −59.262 | 2.80 | 1.53110 | 55.9 |
| 4* | −858.745 | 0.15 | | |
| 5 | 46.234 | 3.30 | 1.92286 | 20.9 |
| 6 | 79.048 | (Variable) | | |
| 7 | 21.043 | 4.64 | 1.80400 | 46.5 |
| 8 | 172.624 | 2.15 | | |
| 9 | −5060.863 | 4.00 | 1.73037 | 32.2 |
| 10 | 13.782 | 0.37 | | |
| 11 | 17.389 | 4.12 | 1.75500 | 52.3 |
| 12 | −278.333 | 1.71 | | |
| 13 (Diaphragm) | ∞ | (Variable) | | |
| 14* | −66.256 | 1.20 | 1.82165 | 24.0 |

-continued

| 15 | −282.440 | 3.65 | | |
| 16 | ∞ | (Variable) | | |
| 17 | −129.496 | 4.64 | 1.59522 | 67.7 |
| 18 | −13.532 | 1.00 | 1.72916 | 54.7 |
| 19 | −22.824 | (Variable) | | |
| 20* | 110.948 | 2.98 | 1.53110 | 55.9 |
| 21* | 29.174 | (Variable) | | |
| 22 | 154.476 | 2.41 | 1.98612 | 16.5 |
| 23 | −14900.415 | (Variable) | | |
| Image Plane | ∞ | | | |

ASPHERICAL SURFACE DATA

3rd Surface
K = 0.00000e+000 A 4 = 2.47198e−005
A 6 = −8.08847e−008 A 8 = 1.65476e−010
A10 = −1.37297e−013 A12 = 3.16753e−017
4th Surface
K = −8.61713e+003 A 4 = 1.91654e−005
A 6 = −6.74993e−008 A 8 = 7.58767e−011
A10 = 1.07307e−013 A12 = −2.66741e−016
14th Surface
K = 0.00000e+000 A 4 = −9.45333e−006
A 6 = 1.17313e−007 A 8 = −6.37183e−012
A10 = 2.95045e−011 A12 = 0.00000e+000
20th Surface
K = 0.00000e+000 A 4 = −1.23685e−004
A 6 = 4.03138e−007 A 8 = 6.98371e−010
A10 = −1.74137e−011 A12 = 5.43473e−014
21st Surface
K = 0.00000e+000 A 4 = −1.34776e−004
A 6 = 5.78897e−007 A 8 = −1.36238e−009
A10 = −2.66916e−012 A12 = 1.50537e−014

VARIOUS DATA
Zoom Ratio 2.84

| | Wide Angle | Middle | Telephoto |
|---|---|---|---|
| Focal Length: | 20.61 | 39.47 | 58.50 |
| F-NUMBER: | 4.64 | 5.88 | 6.49 |
| Half Angle of View (°): | 41.17 | 26.75 | 19.41 |
| Image Height: | 18.02 | 19.90 | 20.61 |
| Overall Lens Length: | 135.00 | 120.11 | 125.50 |
| BF: | 10.49 | 11.09 | 11.70 |
| d6 | 46.04 | 13.39 | 1.02 |
| d13 | 2.30 | 4.06 | 5.83 |
| d16 | 7.15 | 9.97 | 10.76 |
| d19 | 9.71 | 5.12 | 2.57 |
| d21 | 1.30 | 18.46 | 35.61 |
| d23 | 10.49 | 11.09 | 11.70 |

ZOOM LENS UNIT DATA

| Unit | Starting Surface | Focal Length |
|---|---|---|
| 1 | 1 | −47.50 |
| 2 | 7 | 34.88 |
| 3 | 14 | −105.62 |
| 4 | 17 | 55.50 |
| 5 | 20 | −75.48 |
| 6 | 22 | 155.06 |

Various values in each numerical example are summarized in Table 1 given below.

| | Ex. 1 | Ex. 2 | Ex. 3 | Ex. 4 | Ex. 5 | Ex. 6 |
|---|---|---|---|---|---|---|
| fG1 | −31.445 | −33.490 | −35.095 | −44.964 | −40.330 | −46.554 |
| fG2 | −112.730 | −201.481 | −181.813 | −274.637 | −187.194 | −120.000 |
| ndG1 | 1.639 | 1.639 | 1.623 | 1.639 | 1.639 | 1.639 |
| fL1 | −40.136 | −44.094 | −46.240 | −66.855 | −45.322 | −47.499 |
| fL2 | 39.511 | 41.433 | 38.995 | 42.893 | 32.920 | 34.883 |
| fLP | 62.750 | 62.737 | 117.402 | 96.881 | 65.648 | 55.488 |
| vdG1 | 55.38 | 55.38 | 58.16 | 55.38 | 55.38 | 55.38 |
| ndLPP | 1.487 | 1.487 | 1.497 | 1.538 | 1.497 | 1.595 |
| vdLPP | 70.23 | 70.23 | 81.54 | 74.70 | 81.54 | 67.74 |
| ndL1p | 1.699 | 1.741 | 1.850 | 2.001 | 1.923 | 1.923 |
| vdL1P | 30.130 | 27.790 | 32.270 | 29.134 | 20.881 | 20.881 |
| MLP | 19.992 | −18.374 | −16.538 | −16.456 | −18.059 | −28.381 |
| ML2 | −20.250 | −19.181 | −20.025 | −18.218 | −20.855 | −35.521 |
| DSPw | 50.829 | 34.284 | 49.629 | 48.155 | 43.974 | 46.834 |
| TLw | 105.604 | 91.568 | 111.003 | 130.022 | 120.001 | 135.000 |
| G1R2 | 18.479 | 19.216 | 19.941 | 22.250 | 19.361 | 22.272 |
| G1R1 | 238.756 | 194.836 | 232.845 | −128.744 | 80.208 | 85.085 |
| (1) fLP/fL2 | 1.59 | 1.51 | 3.01 | 2.26 | 1.99 | 1.59 |
| (2) fL1/fL2 | −1.02 | −1.06 | −1.19 | −1.56 | −1.38 | −1.36 |
| (3) DSPw/TLw | 0.48 | 0.37 | 0.45 | 0.37 | 0.37 | 0.35 |
| (4) ndG1 | 1.64 | 1.64 | 1.62 | 1.64 | 1.64 | 1.64 |
| (5) vdG1 | 55.4 | 55.4 | 58.2 | 55.4 | 55.4 | 55.4 |
| (6) ndLPP | 1.487 | 1.487 | 1.497 | 1.538 | 1.497 | 1.595 |
| (7) vdLPP | 70 | 70 | 82 | 75 | 82 | 68 |
| (8) ndL1P | 1.70 | 1.74 | 1.85 | 2.00 | 1.92 | 1.92 |
| (9) vdLtP | 30 | 28 | 32 | 29 | 21 | 21 |
| (10) MLP/ML2 | 0.99 | 0.96 | 0.83 | 0.90 | 0.87 | 0.80 |
| (11) fG1/fG2 | 0.28 | 0.17 | 0.19 | 0.16 | 0.22 | 0.39 |
| (12) (G1R2 + G1R1)/ (G1R2 − G1R1) | −1.17 | −1.22 | −1.19 | −0.71 | −1.64 | −1.71 |

Image Pickup Apparatus

Figure 13:
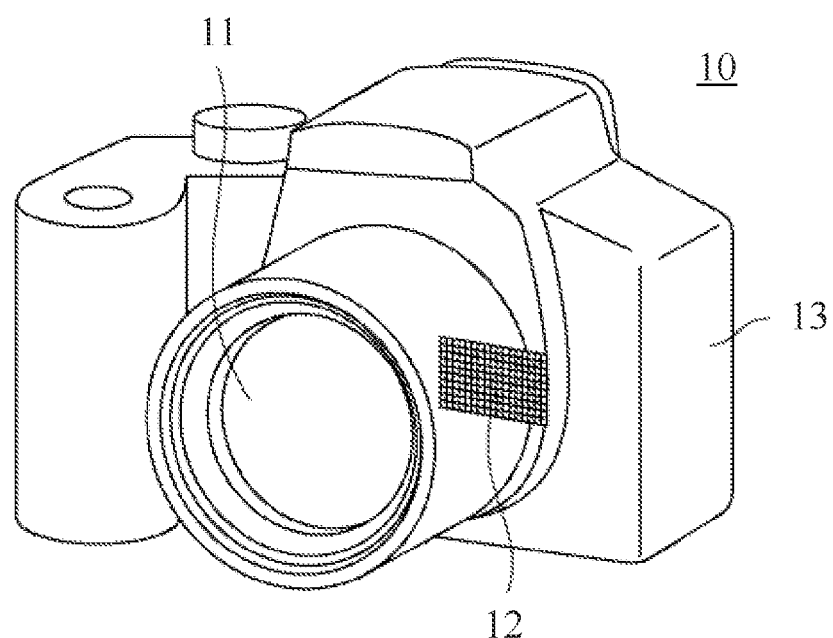
FIG. 13 is a schematic view of an image pickup apparatus.

Next, with reference to FIG. 13, a description is given of an embodiment of a digital camera (image pickup apparatus) using the zoom lens L0 of the present disclosure as an imaging optical system. FIG. 13 is a schematic diagram of an image pickup apparatus (digital still camera) 10 according to this embodiment. The image pickup apparatus 10 includes a camera body 13, a zoom lens 11 similar to any of the zoom lenses according to Examples 1 to 6 described above, and a light-receiving element (image sensor) 12 that is built into the camera body 13 and that photoelectrically converts an optical image formed by the zoom lens 11. The camera body 13 may be a so-called single-lens reflex camera having a quick turn mirror, or may be a so-called mirrorless camera having no quick turn mirror.

By having the small zoom lens 11 having good optical characteristics, the image pickup apparatus 10 according to this embodiment can acquire high-quality images.

An image sensor such as CCD and CMOS sensors can be used as the light-receiving element 12. By electrically correcting various aberrations such as distortion and chromatic aberration in an image acquired by the light-receiving element 12, a high-quality output image can be acquired.

The zoom lens L0 according to each example described above can be applied not only to the digital still camera illustrated in FIG. 13, but also to various optical devices such as silver-halide film cameras, video cameras, and telescopes.

Image Pickup System

An image pickup system (surveillance camera system) may be configured that includes the zoom lens L0 according to each example and a controlling unit configured to control the zoom lens L0. In this case, the controlling unit can control the zoom lens L0 so that each lens unit moves as described above during zooming, focusing, and image stabilization. The controlling unit may not be configured integrally with the zoom lens L0, and the controlling unit may be configured separately from the zoom lens L0. For example, a configuration may be such that the controlling unit (controlling apparatus) placed away from a driving unit for driving each lens of the zoom lens L0 includes a transmitting unit that transmits a control signal (instruction) for controlling the zoom lens L0. By using such a controlling unit, the zoom lens L0 can be remotely controlled.

Further, the configuration may be such that the controlling unit includes an operation unit such as a controller and buttons for remotely operating the zoom lens L0 and thereby the zoom lens L0 is controlled according to input by a user to the operation unit. For example, an enlargement button and a reduction button may be provided as the operation unit. In this case, the configuration may be such that a signal is transmitted from the controlling unit to the driving unit of the zoom lens L0 so that when the user presses the enlargement button, the magnification of the zoom lens L0 increases and when the user presses the reduction button, the magnification of the zoom lens L0 decreases.

The image pickup system may include a display unit such as a liquid crystal panel that displays information on zooming (moving state) of the zoom lens L0. The information on zooming of the zoom lens L0 is, for example, a zooming magnification (zooming state) or a moving amount (moving state) of each lens unit. In this case, the user can remotely operate the zoom lens L0 via the operation unit while viewing the information on zooming of the zoom lens L0 displayed on the display unit. In this case, the display unit and operation unit may be integrally configured by adopting, for example, a touch panel.

According to the above-described embodiments, it is possible to provide a small zoom lens having good optical characteristics, and an image pickup apparatus and an image pickup system having the zoom lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-000021, filed on Jan. 1, 2022, which is hereby incorporated by reference herein in its entirety.

What is claimed is:

1. A zoom lens consisting of, in order from an object side to an image side, a first lens unit having a negative refractive power, a second lens unit having a positive refractive power, and a rear group including one or more lens units, wherein each distance between adjacent lens units changes during zooming, wherein the rear group includes a focus lens unit having a positive refractive power that moves from the image side to the object side during focusing from an infinite distance object to a close distance object, wherein a lens closest to an object in the focus lens unit has a shape with a concave surface on the object side, and wherein following inequalities are satisfied:

$$1.20 < fLP/fL2 < 3.20$$

$$-3.00 < fL1/fL2 < -0.85$$

$$0.80 \leq MLP/ML2 < 1.50$$

where fLP represents a focal length of the focus lens unit, fL1 represents a focal length of the first lens unit, fL2 represents a focal length of the second lens unit, MLP represents a moving amount of the focus lens unit during zooming from a wide-angle end to a telephoto end in a state where an infinite distance object is focused on, and ML2 represents a moving amount of the second lens unit during zooming from the wide-angle end to the telephoto end in the state where the infinite distance object is focused on.

2. The zoom lens according to claim 1, wherein a following inequality is satisfied:

$$0.25 < DSPw/TLw < 0.53$$

where DSPw represents a distance on an optical axis from an aperture diaphragm to an image plane at the wide-angle end, and TLw represents an overall lens length of the zoom lens at the wide-angle end.

3. The zoom lens according to claim 1, wherein the first lens unit includes, in order from the object side to the image side, a first negative lens and a second negative lens, and wherein a following inequality is satisfied:

$$1.40 < ndG1 < 1.69$$

where ndG1 represents a refractive index of the first negative lens.

4. The zoom lens according to claim 1, wherein the first lens unit includes, in order from the object side to the image side, a first negative lens and a second negative lens, and wherein a following inequality is satisfied:

$$45 < vdG1 < 95$$

where vdG1 represents an Abbe number of the first negative lens.

5. The zoom lens according to claim 1, wherein a following inequality is satisfied:

$$1.40 < ndLPP < 1.65$$

where ndLPP represents a refractive index of a positive lens having a largest positive refractive power value in the focus lens unit.

6. The zoom lens according to claim 1, wherein a following inequality is satisfied:

$$45 < vdLPP < 95$$

where vdLPP represents an Abbe number of a positive lens having a largest positive refractive power value in the focus lens unit.

7. The zoom lens according to claim 1, wherein a following inequality is satisfied:

$$1.60 < ndL1P < 2.10$$

where ndL1P represents a refractive index of a positive lens having a largest positive refractive power value in the first lens unit.

8. The zoom lens according to claim 1, wherein a following inequality is satisfied:

$$15 < vdL1P < 45$$

where vdL1P represents an Abbe number of a positive lens having a largest positive refractive power value in the first lens unit.

9. The zoom lens according to claim 1, wherein the first lens unit includes, in order from the object side to the image side, a first negative lens and a second negative lens, and
wherein there is an air distance on an optical axis between the first negative lens and the second negative lens.

10. The zoom lens according to claim 1, wherein the first lens unit includes, in order from the object side to the image side, a first negative lens and second negative lens, and
wherein a following inequality is satisfied:

$$0 < fG1/fG2 < 0.42$$

where fG1 represents a focal length of the first negative lens, and fG2 represents a focal length of the second negative lens.

11. The zoom lens according to claim 1, wherein the first lens unit includes, in order from the object side to the image side, a first negative lens and a second negative lens, and
wherein a following inequality is satisfied:

$$-3.00 < (G1R2+G1R1)/(G1R2-G1R1) < -0.10$$

where G1R2 represents a curvature radius of a lens surface on the image side of the first negative lens, and G1R1 represents a curvature radius of a lens surface on object side of the first negative lens.

12. The zoom lens according to claim 1, wherein the first lens unit consists of, in order from the object side to the image side, a first negative lens, a second negative lens, and a positive lens.

13. The zoom lens according to claim 1, wherein the first lens unit includes, in order from the object side to the image side, a first negative lens and a second negative lens, and
wherein the second negative lens is made of a resin material.

14. The zoom lens according to claim 1, wherein the first lens unit includes, in order from the object side to the image side, a first negative lens and a second negative lens, and
wherein at least one of lens surfaces on the object side and the image side of the second negative lens has an aspherical shape.

15. The zoom lens according to claim 1, wherein the second lens unit includes an aperture diaphragm, and
wherein the aperture diaphragm is disposed at a position closest to an image in the second lens unit.

16. The zoom lens according to claim 1, wherein the number of lenses in the second lens unit is three or less.

17. The zoom lens according to claim 1, wherein the focus lens unit consists of a single positive lens element having a meniscus shape that has a concave surface on the object side.

18. The zoom lens according to claim 1, wherein the second lens unit moves in a direction including a component orthogonal to an optical axis during image stabilization.

19. The zoom lens according to claim 1, wherein the rear group consists of, in order from the object side to the image side, a third lens unit having a positive refractive power and a fourth lens unit having a negative refractive power.

20. The zoom lens according to claim 1, wherein the rear group consists of, in order from the object side to the image side, a third lens unit having a positive refractive power and a fourth lens unit having a positive refractive power.

21. The zoom lens according to claim 1, wherein the rear group consists of, in order from the object side to the image side, a third lens unit having a positive refractive power, a fourth lens unit having a negative refractive power, and a fifth lens unit having a positive refractive power.

22. The zoom lens according to claim 1, wherein the rear group consists of, in order from the object side to the image side, a third lens unit having a negative refractive power, a fourth lens unit having a positive refractive power, and a fifth lens unit having a negative refractive power.

23. The zoom lens according to claim 1, wherein the rear group consists of, in order from the object side to the image side, a third lens unit having a negative refractive power, a fourth lens unit having a positive refractive power, a fifth lens unit having a negative refractive power, and a sixth lens unit having a positive refractive power.

24. An image pickup apparatus comprising:
a zoom lens; and
an image sensor configured to receive light of an image formed by the zoom lens,
wherein the zoom lens consists of, in order from an object side to an image side, a first lens unit having a negative refractive power, a second lens unit having a positive refractive power, and a rear group including one or more lens units, wherein each distance between adjacent lens units changes during zooming,
wherein the rear group includes a focus lens unit having a positive refractive power that moves from the image side to the object side during focusing from an infinite distance object to a close distance object,
wherein a lens closest to an object in the focus lens unit has a shape with a concave surface on the object side, and
wherein following inequalities are satisfied:

$$1.20 < fLP/fL2 < 3.20$$

$$-3.00 < fL1/fL2 < -0.85$$

$$0.80 \leq MLP/ML2 < 1.50$$

where fLP represents a focal length of the focus lens unit, fL1 represents a focal length of the first lens unit, fL2 represents a focal length of the second lens unit, MLP represents a moving amount of the focus lens unit during zooming from a wide-angle end to a telephoto end in a state where an infinite distance object is focused on, and ML2 represents a moving amount of the second lens unit during zooming from the wide-angle end to the telephoto end in the state where the infinite distance object is focused on.

25. The image pickup apparatus according to claim 24, wherein in the image sensor, an effective image circle diameter at the wide-angle end is smaller than an effective image circle diameter at the telephoto end.

* * * * *